US012542123B2

(12) United States Patent
Sconza

(10) Patent No.: US 12,542,123 B2
(45) Date of Patent: Feb. 3, 2026

(54) MASK NON-LINEAR PROCESSOR FOR ACOUSTIC ECHO CANCELLATION

(71) Applicant: Shure Acquisition Holdings, Inc., Niles, IL (US)

(72) Inventor: Justin Joseph Sconza, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 671 days.

(21) Appl. No.: 17/823,295

(22) Filed: Aug. 30, 2022

(65) Prior Publication Data

US 2023/0065067 A1 Mar. 2, 2023

Related U.S. Application Data

(60) Provisional application No. 63/260,750, filed on Aug. 31, 2021.

(51) Int. Cl.
*H04M 9/08* (2006.01)
*G10K 11/178* (2006.01)

(52) U.S. Cl.
CPC .. *G10K 11/17854* (2018.01); *G10K 11/17881* (2018.01); *H04M 9/082* (2013.01)

(58) Field of Classification Search
CPC .................................................... H04M 9/082
See application file for complete search history.

(56) References Cited

U.S. PATENT DOCUMENTS 1,535,408 A 4/1925 Fricke
1,540,788 A 6/1925 Mcclure
1,965,830 A 7/1934 Hammer
2,075,588 A 3/1937 Meyers
2,113,219 A 4/1938 Olson
2,164,655 A 7/1939 Kleerup
D122,771 S 10/1940 Doner
2,233,412 A 3/1941 Hill
2,268,529 A 12/1941 Stiles
(Continued)

FOREIGN PATENT DOCUMENTS

CA 2359771 4/2003
CA 2475283 1/2005
(Continued)

OTHER PUBLICATIONS

Buck, et al., "Self-Calibrating Microphone Arrays for Speech Signal Acquisition: A Systematic Approach," Signal Processing, vol. 86, 2006, pp. 1230-1238.
(Continued)

*Primary Examiner* — Ping Lee
(74) *Attorney, Agent, or Firm* — ALSTON & BIRD LLP

(57) ABSTRACT

Acoustic echo cancellation systems and methods are provided that can generate a continuous mask value that can be used as a gain of a non-linear processor. Communication between a loudspeaker and the non-linear processor can be utilized to adjust the threshold of the non-linear processor when the loudspeaker is active to assist in suppressing far end single talk leakage. The systems and methods can improve the removal of residual echo and therefore enhance the overall performance of the acoustic echo cancellation system.

18 Claims, 5 Drawing Sheets

(56) References Cited

U.S. PATENT DOCUMENTS

| | | | |
|---|---|---|---|
| 2,343,037 | A | 2/1944 | Adelman |
| 2,377,449 | A | 6/1945 | Prevette |
| 2,481,250 | A | 9/1949 | Schneider |
| 2,521,603 | A | 9/1950 | Prew |
| 2,533,565 | A | 12/1950 | Eichelman |
| 2,539,671 | A | 1/1951 | Olson |
| 2,777,232 | A | 1/1957 | Kulicke |
| 2,828,508 | A | 4/1958 | Labarre |
| 2,840,181 | A | 6/1958 | Wildman |
| 2,882,633 | A | 4/1959 | Howell |
| 2,912,605 | A | 11/1959 | Tibbetts |
| 2,938,113 | A | 5/1960 | Schnell |
| 2,950,556 | A | 8/1960 | Larios |
| 3,019,854 | A | 2/1962 | Obryant |
| 3,132,713 | A | 5/1964 | Seeler |
| 3,143,182 | A | 8/1964 | Sears |
| 3,160,225 | A | 12/1964 | Sechrist |
| 3,161,975 | A | 12/1964 | Mcmillan |
| 3,205,601 | A | 9/1965 | Gawne |
| 3,239,973 | A | 3/1966 | Hannes |
| 3,240,883 | A | 3/1966 | Seeler |
| 3,310,901 | A | 3/1967 | Sarkisian |
| 3,321,170 | A | 5/1967 | Vye |
| 3,509,290 | A | 4/1970 | Mochida |
| 3,573,399 | A | 4/1971 | Schroeder |
| 3,657,490 | A | 4/1972 | Scheiber |
| 3,696,885 | A | 10/1972 | Grieg |
| 3,755,625 | A | 8/1973 | Maston |
| 3,828,508 | A | 8/1974 | Moeller |
| 3,857,191 | A | 12/1974 | Sadorus |
| 3,895,194 | A | 7/1975 | Fraim |
| 3,906,431 | A | 9/1975 | Clearwaters |
| D237,103 | S | 10/1975 | Fisher |
| 3,936,606 | A | 2/1976 | Wanke |
| 3,938,617 | A | 2/1976 | Forbes |
| 3,941,638 | A | 3/1976 | Horky |
| 3,992,584 | A | 11/1976 | Dugan |
| 4,007,461 | A | 2/1977 | Luedtke |
| 4,008,408 | A | 2/1977 | Kodama |
| 4,029,170 | A | 6/1977 | Phillips |
| 4,032,725 | A | 6/1977 | Mcgee |
| 4,070,547 | A | 1/1978 | Dellar |
| 4,072,821 | A | 2/1978 | Bauer |
| 4,096,353 | A | 6/1978 | Bauer |
| 4,127,156 | A | 11/1978 | Brandt |
| 4,131,760 | A | 12/1978 | Christensen |
| 4,169,219 | A | 9/1979 | Beard |
| 4,184,048 | A | 1/1980 | Alcaide |
| 4,198,705 | A | 4/1980 | Massa |
| D255,234 | S | 6/1980 | Wellward |
| D256,015 | S | 7/1980 | Doherty |
| 4,212,133 | A | 7/1980 | Lufkin |
| 4,237,339 | A | 12/1980 | Bunting |
| 4,244,096 | A | 1/1981 | Kashichi |
| 4,244,906 | A | 1/1981 | Heinemann |
| 4,254,417 | A | 3/1981 | Speiser |
| 4,275,694 | A | 6/1981 | Nagaishi |
| 4,296,280 | A | 10/1981 | Richie |
| 4,305,141 | A | 12/1981 | Massa |
| 4,308,425 | A | 12/1981 | Momose |
| 4,311,874 | A | 1/1982 | Wallace, Jr. |
| 4,330,691 | A | 5/1982 | Gordon |
| 4,334,740 | A | 6/1982 | Wray |
| 4,365,449 | A | 12/1982 | Liautaud |
| 4,373,191 | A | 2/1983 | Fette |
| 4,393,631 | A | 7/1983 | Krent |
| 4,414,433 | A | 11/1983 | Horie |
| 4,429,850 | A | 2/1984 | Weber |
| 4,436,966 | A | 3/1984 | Botros |
| 4,449,238 | A | 5/1984 | Lee |
| 4,466,117 | A | 8/1984 | Rudolf |
| 4,485,484 | A | 11/1984 | Flanagan |
| 4,489,442 | A | 12/1984 | Anderson |
| 4,518,826 | A | 5/1985 | Caudill |
| 4,521,908 | A | 6/1985 | Miyaji |
| 4,566,557 | A | 1/1986 | Lemaitre |
| 4,593,404 | A | 6/1986 | Bolin |
| 4,594,478 | A | 6/1986 | Gumb |
| D285,067 | S | 8/1986 | Delbuck |
| 4,625,827 | A | 12/1986 | Bartlett |
| 4,653,102 | A | 3/1987 | Hansen |
| 4,658,425 | A | 4/1987 | Julstrom |
| 4,669,108 | A | 5/1987 | Deinzer |
| 4,675,906 | A | 6/1987 | Sessler |
| 4,693,174 | A | 9/1987 | Anderson |
| 4,696,043 | A | 9/1987 | Iwahara |
| 4,712,231 | A | 12/1987 | Julstrom |
| 4,741,038 | A | 4/1988 | Elko |
| 4,752,961 | A | 6/1988 | Kahn |
| 4,805,730 | A | 2/1989 | O'Neill |
| 4,815,132 | A | 3/1989 | Minami |
| 4,860,366 | A | 8/1989 | Fukushi |
| 4,862,507 | A | 8/1989 | Woodard |
| 4,866,868 | A | 9/1989 | Kass |
| 4,881,135 | A | 11/1989 | Heilweil |
| 4,888,807 | A | 12/1989 | Reichel |
| 4,903,247 | A | 2/1990 | Van Gerwen |
| 4,923,032 | A | 5/1990 | Nuernberger |
| 4,928,312 | A | 5/1990 | Hill |
| 4,969,197 | A | 11/1990 | Takaya |
| 5,000,286 | A | 3/1991 | Crawford |
| 5,038,935 | A | 8/1991 | Wenkman |
| 5,058,170 | A | 10/1991 | Kanamori |
| 5,088,574 | A | 2/1992 | Kertesz, III |
| D324,780 | S | 3/1992 | Sebesta |
| 5,121,426 | A | 6/1992 | Baumhauer |
| D329,239 | S | 9/1992 | Hahn |
| 5,189,701 | A | 2/1993 | Jain |
| 5,204,907 | A | 4/1993 | Staple |
| 5,214,709 | A | 5/1993 | Ribic |
| D340,718 | S | 10/1993 | Leger |
| 5,289,544 | A | 2/1994 | Franklin |
| D345,346 | S | 3/1994 | Alfonso |
| D345,379 | S | 3/1994 | Chan |
| 5,297,210 | A | 3/1994 | Julstrom |
| 5,322,979 | A | 6/1994 | Cassity |
| 5,323,459 | A | 6/1994 | Hirano |
| 5,329,593 | A | 7/1994 | Lazzeroni |
| 5,335,011 | A | 8/1994 | Addeo |
| 5,353,279 | A | 10/1994 | Koyama |
| 5,359,374 | A | 10/1994 | Schwartz |
| 5,371,789 | A | 12/1994 | Hirano |
| 5,383,293 | A | 1/1995 | Royal |
| 5,384,843 | A | 1/1995 | Masuda |
| 5,396,554 | A | 3/1995 | Hirano |
| 5,400,413 | A | 3/1995 | Kindel |
| D363,045 | S | 10/1995 | Phillips |
| 5,473,701 | A | 12/1995 | Cezanne |
| 5,509,634 | A | 4/1996 | Gebka |
| 5,513,265 | A | 4/1996 | Hirano |
| 5,525,765 | A | 6/1996 | Freiheit |
| 5,550,924 | A | 8/1996 | Helf |
| 5,550,925 | A | 8/1996 | Hori |
| 5,555,447 | A | 9/1996 | Kotzin |
| 5,574,793 | A | 11/1996 | Hirschhorn |
| 5,602,962 | A | 2/1997 | Kellermann |
| 5,633,936 | A | 5/1997 | Oh |
| 5,645,257 | A | 7/1997 | Ward |
| D382,118 | S | 8/1997 | Ferrero |
| 5,657,393 | A | 8/1997 | Crow |
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |

(56) References Cited

U.S. PATENT DOCUMENTS 5,878,147 A 3/1999 Killion
5,888,412 A 3/1999 Sooriakumar
5,888,439 A 3/1999 Miller
D416,315 S 11/1999 Nanjo
5,978,211 A 11/1999 Hong
5,991,277 A 11/1999 Maeng
6,035,962 A 3/2000 Lin
6,039,457 A 3/2000 O'Neal
6,041,127 A 3/2000 Elko
6,049,607 A 4/2000 Marash
D424,538 S 5/2000 Hayashi
6,069,961 A 5/2000 Nakazawa
6,125,179 A 9/2000 Wu
D432,518 S 10/2000 Muto
6,128,395 A 10/2000 De Vries
6,137,887 A 10/2000 Anderson
6,144,746 A 11/2000 Azima
6,151,399 A 11/2000 Killion
6,160,886 A * 12/2000 Romesburg ........... H04M 9/082 379/406.05
6,173,059 B1 1/2001 Huang
6,185,300 B1 * 2/2001 Romesburg ........... H04M 9/082 370/290
6,198,831 B1 3/2001 Azima
6,205,224 B1 3/2001 Underbrink
6,215,881 B1 4/2001 Azima
6,266,427 B1 7/2001 Mathur
6,285,770 B1 9/2001 Azima
6,301,357 B1 10/2001 Romesburg
6,329,908 B1 12/2001 Frecska
6,332,029 B1 12/2001 Azima
D453,016 S 1/2002 Nevill
6,386,315 B1 5/2002 Roy
6,393,129 B1 5/2002 Conrad
6,424,635 B1 7/2002 Song
6,442,272 B1 8/2002 Osovets
6,449,593 B1 9/2002 Valve
6,481,173 B1 11/2002 Roy
6,488,367 B1 12/2002 Debesis
D469,090 S 1/2003 Tsuji
6,505,057 B1 1/2003 Finn
6,507,659 B1 1/2003 Iredale
6,510,919 B1 1/2003 Roy
6,526,147 B1 2/2003 Rung
6,556,682 B1 4/2003 Gilloire
6,592,237 B1 7/2003 Pledger
6,622,030 B1 9/2003 Romesburg
D480,923 S 10/2003 Neubourg
6,633,647 B1 10/2003 Markow
6,665,971 B2 12/2003 Lowry
6,694,028 B1 2/2004 Matsuo
6,704,422 B1 3/2004 Jensen
D489,707 S 5/2004 Kobayashi
6,731,334 B1 5/2004 Maeng
6,741,720 B1 5/2004 Myatt
6,757,393 B1 6/2004 Spitzer
6,768,795 B2 7/2004 Feltstroem
6,868,377 B1 3/2005 Laroche
6,885,750 B2 4/2005 Egelmeers
6,885,986 B1 4/2005 Gigi
D504,889 S 5/2005 Andre
6,889,183 B1 5/2005 Gunduzhan
6,895,093 B1 5/2005 Ali
6,931,123 B1 8/2005 Hughes
6,944,312 B2 9/2005 Mason
D510,729 S 10/2005 Chen
6,968,064 B1 11/2005 Ning
6,990,193 B2 1/2006 Beaucoup
6,993,126 B1 1/2006 Kyrylenko
6,993,145 B2 1/2006 Combest
7,003,099 B1 2/2006 Zhang
7,013,267 B1 3/2006 Huart
7,031,269 B2 4/2006 Lee
7,035,398 B2 4/2006 Matsuo
7,035,415 B2 4/2006 Belt
7,050,576 B2 5/2006 Zhang
7,054,451 B2 5/2006 Janse
D526,643 S 8/2006 Ishizaki
D527,372 S 8/2006 Allen
7,092,516 B2 8/2006 Furuta
7,092,882 B2 8/2006 Arrowood
7,098,865 B2 8/2006 Christensen
7,106,876 B2 9/2006 Santiago
7,120,269 B2 10/2006 Lowell
7,130,309 B2 10/2006 Pianka
D533,177 S 12/2006 Andre
7,149,320 B2 12/2006 Haykin
7,161,534 B2 1/2007 Tsai
7,187,765 B2 3/2007 Popovic
7,203,308 B2 4/2007 Kubota
D542,543 S 5/2007 Bruce
7,212,628 B2 5/2007 Mirjana
D546,318 S 7/2007 Yoon
D546,814 S 7/2007 Takita
D547,748 S 7/2007 Tsuge
7,239,714 B2 7/2007 de Blok
D549,673 S 8/2007 Niitsu
7,269,263 B2 9/2007 Dedieu
D552,570 S 10/2007 Niitsu
D559,553 S 1/2008 James
7,333,476 B2 2/2008 LeBlanc
D566,685 S 4/2008 Koller
7,359,504 B1 4/2008 Reuss
7,366,310 B2 4/2008 Stinson
7,387,151 B1 6/2008 Payne
7,412,376 B2 8/2008 Florencio
7,415,117 B2 8/2008 Tashev
D578,509 S 10/2008 Thomas
D581,510 S 11/2008 Albano
D582,391 S 12/2008 Morimoto
D587,709 S 3/2009 Niitsu
D589,605 S 3/2009 Reedy
7,503,616 B2 3/2009 Linhard
7,515,719 B2 4/2009 Hooley
7,536,769 B2 5/2009 Pedersen
D595,402 S 6/2009 Miyake
D595,736 S 7/2009 Son
7,558,381 B1 7/2009 Ali
7,565,949 B2 7/2009 Tojo
D601,585 S 10/2009 Andre
7,651,390 B1 1/2010 Profeta
7,660,428 B2 2/2010 Rodman
7,667,728 B2 2/2010 Kenoyer
7,672,445 B1 3/2010 Zhang
D613,338 S 4/2010 Marukos
7,701,110 B2 4/2010 Fukuda
7,702,116 B2 4/2010 Stone
D614,871 S 5/2010 Tang
7,724,891 B2 5/2010 Beaucoup
D617,441 S 6/2010 Koury
7,747,001 B2 6/2010 Kellermann
7,756,278 B2 7/2010 Moorer
7,783,063 B2 8/2010 Pocino
7,787,328 B2 8/2010 Chu
7,830,862 B2 11/2010 James
7,831,035 B2 11/2010 Stokes
7,831,036 B2 11/2010 Beaucoup
7,856,097 B2 12/2010 Tokuda
7,881,486 B1 2/2011 Killion
7,894,421 B2 2/2011 Kwan
D636,188 S 4/2011 Kim
7,925,006 B2 4/2011 Hirai
7,925,007 B2 4/2011 Stokes
7,936,886 B2 5/2011 Kim
7,970,123 B2 6/2011 Beaucoup
7,970,151 B2 6/2011 Oxford
D642,385 S 8/2011 Lee
D643,015 S 8/2011 Kim
7,991,167 B2 8/2011 Oxford
7,995,768 B2 8/2011 Miki
8,000,481 B2 8/2011 Nishikawa
8,005,238 B2 8/2011 Tashev
8,019,091 B2 9/2011 Burnett
8,041,054 B2 10/2011 Yeldener

(56) References Cited

U.S. PATENT DOCUMENTS 8,059,843 B2 11/2011 Hung
8,064,629 B2 11/2011 Jiang
8,085,947 B2 12/2011 Haulick
8,085,949 B2 12/2011 Kim
8,095,120 B1 1/2012 Blair
8,098,842 B2 1/2012 Florencio
8,098,844 B2 1/2012 Elko
8,103,030 B2 1/2012 Barthel
8,109,360 B2 2/2012 Stewart, Jr.
8,112,272 B2 2/2012 Nagahama
8,116,500 B2 2/2012 Oxford
8,121,834 B2 2/2012 Rosec
D655,271 S 3/2012 Park
D656,473 S 3/2012 Laube
8,130,969 B2 3/2012 Buck
8,130,977 B2 3/2012 Chu
8,135,143 B2 3/2012 Ishibashi
8,144,886 B2 3/2012 Ishibashi
D658,153 S 4/2012 Woo
8,155,331 B2 4/2012 Nakadai
8,170,882 B2 5/2012 Davis
8,175,291 B2 5/2012 Chan
8,175,871 B2 5/2012 Wang
8,184,801 B1 5/2012 Hamalainen
8,189,765 B2 5/2012 Nishikawa
8,189,810 B2 5/2012 Wolff
8,194,863 B2 6/2012 Takumai
8,199,927 B1 6/2012 Raftery
8,204,198 B2 6/2012 Adeney
8,204,248 B2 6/2012 Haulick
8,208,664 B2 6/2012 Iwasaki
8,213,596 B2 7/2012 Beaucoup
8,213,634 B1 7/2012 Daniel
8,219,387 B2 7/2012 Cutler
8,229,134 B2 7/2012 Duraiswami
8,233,352 B2 7/2012 Beaucoup
8,243,951 B2 8/2012 Ishibashi
8,244,536 B2 8/2012 Arun
8,249,273 B2 8/2012 Inoda
8,259,959 B2 9/2012 Marton
8,275,120 B2 9/2012 Stokes, III
8,280,728 B2 10/2012 Chen
8,284,949 B2 10/2012 Farhang
8,284,952 B2 10/2012 Reining
8,286,749 B2 10/2012 Stewart
8,290,142 B1 10/2012 Lambert
8,291,670 B2 10/2012 Gard
8,297,402 B2 10/2012 Stewart
8,315,380 B2 11/2012 Liu
8,331,582 B2 12/2012 Steele
8,345,898 B2 1/2013 Reining
8,355,521 B2 1/2013 Larson
8,370,140 B2 2/2013 Vitte
8,379,823 B2 2/2013 Ratmanski
8,385,557 B2 2/2013 Tashev
D678,329 S 3/2013 Lee
8,395,653 B2 3/2013 Feng
8,403,107 B2 3/2013 Stewart
8,406,436 B2 3/2013 Craven
8,428,661 B2 4/2013 Chen
8,433,061 B2 4/2013 Cutler
D682,266 S 5/2013 Wu
8,437,490 B2 5/2013 Marton
8,443,930 B2 5/2013 Stewart, Jr.
8,447,590 B2 5/2013 Ishibashi
8,472,639 B2 6/2013 Reining
8,472,640 B2 6/2013 Marton
D685,346 S 7/2013 Szymanski
D686,182 S 7/2013 Ashiwa
8,479,871 B2 7/2013 Stewart
8,483,398 B2 7/2013 Fozunbal
8,498,423 B2 7/2013 Thaden
D687,432 S 8/2013 Duan
8,503,653 B2 8/2013 Ahuja
8,515,089 B2 8/2013 Nicholson
8,515,109 B2 8/2013 Dittberner
8,526,633 B2 9/2013 Ukai
8,553,904 B2 10/2013 Said
8,559,611 B2 10/2013 Ratmanski
D693,328 S 11/2013 Goetzen
8,583,481 B2 11/2013 Viveiros
8,599,194 B2 12/2013 Lewis
8,600,443 B2 12/2013 Kawaguchi
8,605,890 B2 12/2013 Zhang
8,620,650 B2 12/2013 Walters
8,631,897 B2 1/2014 Stewart
8,634,569 B2 1/2014 Lu
8,638,951 B2 1/2014 Zurek
D699,712 S 2/2014 Bourne
8,644,477 B2 2/2014 Gilbert
8,654,955 B1 2/2014 Lambert
8,654,990 B2 2/2014 Faller
8,660,274 B2 2/2014 Wolff
8,660,275 B2 2/2014 Buck
8,670,581 B2 3/2014 Harman
8,672,087 B2 3/2014 Stewart
8,675,890 B2 3/2014 Schmidt
8,675,899 B2 3/2014 Jung
8,676,728 B1 3/2014 Velusamy
8,682,675 B2 3/2014 Togami
8,724,829 B2 5/2014 Visser
8,730,156 B2 5/2014 Weising
8,744,069 B2 6/2014 Cutler
8,744,101 B1 6/2014 Burns
8,755,536 B2 6/2014 Chen
8,787,560 B2 7/2014 Buck
8,811,601 B2 8/2014 Mohammad
8,818,002 B2 8/2014 Tashev
8,824,693 B2 9/2014 Åhgren
8,842,851 B2 9/2014 Beaucoup
8,855,326 B2 10/2014 Derkx
8,855,327 B2 10/2014 Tanaka
8,861,713 B2 10/2014 Xu
8,861,756 B2 10/2014 Zhu
8,873,789 B2 10/2014 Bigeh
D717,272 S 11/2014 Kim
8,886,343 B2 11/2014 Ishibashi
8,893,849 B2 11/2014 Hudson
8,898,633 B2 11/2014 Bryant
D718,731 S 12/2014 Lee
8,903,106 B2 12/2014 Meyer
8,923,529 B2 12/2014 Mccowan
8,929,564 B2 1/2015 Kikkeri
8,942,382 B2 1/2015 Elko
8,965,546 B2 2/2015 Visser
D725,059 S 3/2015 Kim
D725,631 S 3/2015 Mcnamara
8,976,977 B2 3/2015 De
8,983,089 B1 3/2015 Chu
8,983,834 B2 3/2015 Davis
D726,144 S 4/2015 Kang
D727,968 S 4/2015 Onoue
9,002,028 B2 4/2015 Haulick
D729,767 S 5/2015 Lee
9,038,301 B2 5/2015 Zelbacher
9,088,336 B2 7/2015 Mani
9,094,496 B2 7/2015 Teutsch
D735,717 S 8/2015 Lam
D737,245 S 8/2015 Fan
9,099,094 B2 8/2015 Burnett
9,107,001 B2 8/2015 Diethorn
9,111,543 B2 8/2015 Åhgren
9,113,242 B2 8/2015 Hyun
9,113,247 B2 8/2015 Chatlani
9,126,827 B2 9/2015 Hsieh
9,129,223 B1 9/2015 Velusamy
9,140,054 B2 9/2015 Oberbroeckling
D740,279 S 10/2015 Wu
9,172,345 B2 10/2015 Kok
D743,376 S 11/2015 Kim
D743,939 S 11/2015 Seong
9,196,261 B2 11/2015 Burnett
9,197,974 B1 11/2015 Clark
9,203,494 B2 12/2015 Tarighat Mehrabani

(56) References Cited

U.S. PATENT DOCUMENTS 9,215,327 B2 12/2015 Bathurst
9,215,543 B2 12/2015 Sun
9,226,062 B2 12/2015 Sun
9,226,070 B2 12/2015 Hyun
9,226,088 B2 12/2015 Pandey
9,232,185 B2 1/2016 Graham
9,237,391 B2 1/2016 Benesty
9,247,367 B2 1/2016 Nobile
9,253,567 B2 2/2016 Morcelli
9,257,132 B2 2/2016 Gowreesunker
9,264,553 B2 2/2016 Pandey
9,264,805 B2 2/2016 Buck
9,280,985 B2 3/2016 Tawada
9,286,908 B2 3/2016 Zhang
9,294,839 B2 3/2016 Lambert
9,301,049 B2 3/2016 Elko
D754,103 S 4/2016 Fischer
9,307,326 B2 4/2016 Elko
9,319,532 B2 4/2016 Bao
9,319,799 B2 4/2016 Salmon
9,326,060 B2 4/2016 Nicholson
D756,502 S 5/2016 Lee
9,330,673 B2 5/2016 Cho
9,338,301 B2 5/2016 Pocino
9,338,549 B2 5/2016 Haulick
9,354,310 B2 5/2016 Visser
9,357,080 B2 5/2016 Beaucoup
9,403,670 B2 8/2016 Schelling
9,426,598 B2 8/2016 Walsh
D767,748 S 9/2016 Nakai
9,451,078 B2 9/2016 Yang
D769,239 S 10/2016 Li
9,462,378 B2 10/2016 Kuech
9,473,868 B2 10/2016 Huang
9,479,627 B1 10/2016 Rung
9,479,885 B1 10/2016 Ivanov
9,489,948 B1 11/2016 Chu
9,510,090 B2 11/2016 Lissek
9,514,723 B2 12/2016 Silfvast
9,516,412 B2 12/2016 Shigenaga
9,521,057 B2 12/2016 Klingbeil
9,549,245 B2 1/2017 Frater
9,560,446 B1 1/2017 Chang
9,560,451 B2 1/2017 Eichfeld
9,565,493 B2 2/2017 Abraham
9,578,413 B2 2/2017 Sawa
9,578,440 B2 2/2017 Otto
9,589,556 B2 3/2017 Gao
9,591,123 B2 3/2017 Sorensen
9,591,404 B1 3/2017 Chhetri
D784,299 S 4/2017 Cho
9,615,173 B2 4/2017 Sako
9,628,596 B1 4/2017 Bullough
9,635,186 B2 4/2017 Pandey
9,635,474 B2 4/2017 Kuster
D787,481 S 5/2017 Tyss
D788,073 S 5/2017 Silvera
9,640,187 B2 5/2017 Niemisto
9,641,688 B2 5/2017 Pandey
9,641,929 B2 5/2017 Li
9,641,935 B1 5/2017 Ivanov
9,653,091 B2 5/2017 Matsuo
9,653,092 B2 5/2017 Sun
9,655,001 B2 5/2017 Metzger
9,659,576 B1 5/2017 Kotvis
D789,323 S 6/2017 Mackiewicz
9,674,604 B2 6/2017 Deroo
9,692,882 B2 6/2017 Mani
9,706,057 B2 7/2017 Mani
9,716,944 B2 7/2017 Yliaho
9,721,582 B1 8/2017 Huang
9,734,835 B2 8/2017 Fujieda
9,754,572 B2 9/2017 Salazar
9,761,243 B2 9/2017 Taenzer
D801,285 S 10/2017 Timmins
9,788,119 B2 10/2017 Vilermo
9,813,806 B2 11/2017 Graham
9,818,426 B2 11/2017 Kotera
9,826,211 B2 11/2017 Sawa
9,854,101 B2 12/2017 Pandey
9,854,363 B2 12/2017 Sladeczek
9,860,439 B2 1/2018 Sawa
9,866,952 B2 1/2018 Pandey
D811,393 S 2/2018 Ahn
9,894,434 B2 2/2018 Rollow, IV
9,930,448 B1 3/2018 Chen
9,936,290 B2 4/2018 Mohammad
9,966,059 B1 5/2018 Ayrapetian
9,973,848 B2 5/2018 Chhetri
9,980,042 B1 5/2018 Benattar
D819,607 S 6/2018 Chui
D819,631 S 6/2018 Matsumiya
10,015,589 B1 7/2018 Ebenezer
10,021,506 B2 7/2018 Johnson
10,021,515 B1 7/2018 Mallya
10,034,116 B2 7/2018 Kadri
10,054,320 B2 8/2018 Choi
10,061,009 B1 8/2018 Family
10,062,379 B2 8/2018 Katuri
10,153,744 B1 12/2018 Every
10,165,386 B2 12/2018 Lehtiniemi
D841,589 S 2/2019 Böhmer
10,206,030 B2 2/2019 Matsumoto
10,210,882 B1 2/2019 Mccowan
10,231,062 B2 3/2019 Pedersen
10,244,121 B2 3/2019 Mani
10,244,219 B2 3/2019 Sawa
10,269,343 B2 4/2019 Wingate
10,366,702 B2 7/2019 Morton
10,367,948 B2 7/2019 Wells-Rutherford
D857,873 S 8/2019 Shimada
10,389,861 B2 8/2019 Mani
10,389,885 B2 8/2019 Sun
D860,319 S 9/2019 Beruto
D860,997 S 9/2019 Jhun
D864,136 S 10/2019 Kim
10,440,469 B2 10/2019 Barnett
D865,723 S 11/2019 Cho
10,566,008 B2 2/2020 Thorpe
10,602,267 B2 3/2020 Grosche
D883,952 S 5/2020 Lucas
10,650,797 B2 5/2020 Kumar
D888,020 S 6/2020 Lyu
10,728,653 B2 7/2020 Graham
D900,070 S 10/2020 Lantz
D900,071 S 10/2020 Lantz
D900,072 S 10/2020 Lantz
D900,073 S 10/2020 Lantz
D900,074 S 10/2020 Lantz
10,827,263 B2 11/2020 Christoph
10,863,270 B1 12/2020 O'Neill
10,930,297 B2 2/2021 Christoph
10,959,018 B1 3/2021 Shi
10,979,805 B2 4/2021 Chowdhary
D924,189 S 7/2021 Park
11,109,133 B2 8/2021 Lantz
D940,116 S 1/2022 Cho
2001/0031058 A1 10/2001 Anderson
2002/0015500 A1 2/2002 Belt
2002/0041679 A1 4/2002 Beaucoup
2002/0048377 A1 4/2002 Vaudrey
2002/0064158 A1 5/2002 Yokoyama
2002/0064287 A1 5/2002 Kawamura
2002/0069054 A1 6/2002 Arrowood
2002/0110255 A1 8/2002 Killion
2002/0126861 A1 9/2002 Colby
2002/0131580 A1 9/2002 Smith
2002/0140633 A1 10/2002 Rafii
2002/0146282 A1 10/2002 Wilkes
2002/0149070 A1 10/2002 Sheplak
2002/0159603 A1 10/2002 Hirai
2003/0026437 A1 2/2003 Janse
2003/0053639 A1 3/2003 Beaucoup
2003/0059061 A1 3/2003 Tsuji

(56) References Cited

U.S. PATENT DOCUMENTS

| | | | | |
|---|---|---|---|---|
| 2003/0063762 | A1 | 4/2003 | Tajima | |
| 2003/0063768 | A1 | 4/2003 | Cornelius | |
| 2003/0072461 | A1 | 4/2003 | Moorer | |
| 2003/0107478 | A1 | 6/2003 | Hendricks | |
| 2003/0118200 | A1 | 6/2003 | Beaucoup | |
| 2003/0122777 | A1 | 7/2003 | Grover | |
| 2003/0138119 | A1 | 7/2003 | Pocino | |
| 2003/0156725 | A1 | 8/2003 | Boone | |
| 2003/0161485 | A1 | 8/2003 | Smith | |
| 2003/0163326 | A1 | 8/2003 | Maase | |
| 2003/0169888 | A1 | 9/2003 | Subotic | |
| 2003/0185404 | A1 | 10/2003 | Milsap | |
| 2003/0198339 | A1 | 10/2003 | Roy | |
| 2003/0198359 | A1 | 10/2003 | Killion | |
| 2003/0202107 | A1 | 10/2003 | Slattery | |
| 2004/0013038 | A1 | 1/2004 | Kajala | |
| 2004/0013252 | A1 | 1/2004 | Craner | |
| 2004/0076305 | A1 | 4/2004 | Santiago | |
| 2004/0105557 | A1 | 6/2004 | Matsuo | |
| 2004/0125942 | A1 | 7/2004 | Beaucoup | |
| 2004/0175006 | A1 | 9/2004 | Kim | |
| 2004/0202345 | A1 | 10/2004 | Stenberg | |
| 2004/0240664 | A1 | 12/2004 | Freed | |
| 2005/0005494 | A1 | 1/2005 | Way | |
| 2005/0041530 | A1 | 2/2005 | Goudie | |
| 2005/0058277 | A1* | 3/2005 | Barron | H04M 9/082 379/406.01 |
| 2005/0069156 | A1 | 3/2005 | Haapapuro | |
| 2005/0094580 | A1 | 5/2005 | Kumar | |
| 2005/0094795 | A1 | 5/2005 | Rambo | |
| 2005/0149320 | A1 | 7/2005 | Kajala | |
| 2005/0157897 | A1 | 7/2005 | Saltykov | |
| 2005/0175189 | A1 | 8/2005 | Lee | |
| 2005/0175190 | A1 | 8/2005 | Tashev | |
| 2005/0213747 | A1 | 9/2005 | Popovich | |
| 2005/0221867 | A1 | 10/2005 | Zurek | |
| 2005/0238196 | A1 | 10/2005 | Furuno | |
| 2005/0270906 | A1 | 12/2005 | Ramenzoni | |
| 2005/0271221 | A1 | 12/2005 | Cerwin | |
| 2005/0286698 | A1 | 12/2005 | Bathurst | |
| 2005/0286729 | A1 | 12/2005 | Harwood | |
| 2006/0083390 | A1 | 4/2006 | Kaderavek | |
| 2006/0088173 | A1 | 4/2006 | Rodman | |
| 2006/0093128 | A1 | 5/2006 | Oxford | |
| 2006/0098403 | A1 | 5/2006 | Smith | |
| 2006/0104458 | A1 | 5/2006 | Kenoyer | |
| 2006/0109983 | A1 | 5/2006 | Young | |
| 2006/0151256 | A1 | 7/2006 | Lee | |
| 2006/0159293 | A1 | 7/2006 | Azima | |
| 2006/0161430 | A1 | 7/2006 | Schweng | |
| 2006/0165242 | A1 | 7/2006 | Miki | |
| 2006/0192976 | A1 | 8/2006 | Hall | |
| 2006/0198541 | A1 | 9/2006 | Henry | |
| 2006/0204022 | A1 | 9/2006 | Hooley | |
| 2006/0215866 | A1 | 9/2006 | Francisco | |
| 2006/0222187 | A1 | 10/2006 | Jarrett | |
| 2006/0233353 | A1 | 10/2006 | Beaucoup | |
| 2006/0239471 | A1 | 10/2006 | Mao | |
| 2006/0262942 | A1 | 11/2006 | Oxford | |
| 2006/0269080 | A1 | 11/2006 | Oxford | |
| 2006/0269086 | A1 | 11/2006 | Page | |
| 2007/0006474 | A1 | 1/2007 | Taniguchi | |
| 2007/0009116 | A1 | 1/2007 | Reining | |
| 2007/0019828 | A1 | 1/2007 | Hughes | |
| 2007/0053524 | A1 | 3/2007 | Haulick | |
| 2007/0093714 | A1 | 4/2007 | Beaucoup | |
| 2007/0116255 | A1 | 5/2007 | Derkx | |
| 2007/0120029 | A1 | 5/2007 | Keung | |
| 2007/0165871 | A1 | 7/2007 | Roovers | |
| 2007/0230712 | A1 | 10/2007 | Belt | |
| 2007/0253561 | A1 | 11/2007 | Williams | |
| 2007/0269066 | A1 | 11/2007 | Derleth | |
| 2008/0008339 | A1 | 1/2008 | Ryan | |
| 2008/0033723 | A1 | 2/2008 | Jang | |
| 2008/0046235 | A1 | 2/2008 | Chen | |
| 2008/0056517 | A1 | 3/2008 | Algazi | |
| 2008/0101622 | A1 | 5/2008 | Sugiyama | |
| 2008/0130907 | A1 | 6/2008 | Sudo | |
| 2008/0144848 | A1 | 6/2008 | Buck | |
| 2008/0168283 | A1 | 7/2008 | Penning | |
| 2008/0188965 | A1 | 8/2008 | Bruey | |
| 2008/0212805 | A1 | 9/2008 | Fincham | |
| 2008/0232607 | A1 | 9/2008 | Tashev | |
| 2008/0247567 | A1 | 10/2008 | Kjolerbakken | |
| 2008/0253553 | A1 | 10/2008 | Li | |
| 2008/0253589 | A1 | 10/2008 | Trahms | |
| 2008/0259731 | A1 | 10/2008 | Happonen | |
| 2008/0260175 | A1 | 10/2008 | Elko | |
| 2008/0279400 | A1 | 11/2008 | Knoll | |
| 2008/0285772 | A1 | 11/2008 | Haulick | |
| 2009/0003586 | A1 | 1/2009 | Lai | |
| 2009/0030536 | A1 | 1/2009 | Gur | |
| 2009/0052684 | A1 | 2/2009 | Ishibashi | |
| 2009/0086998 | A1 | 4/2009 | Jeong | |
| 2009/0087000 | A1 | 4/2009 | Ko | |
| 2009/0087001 | A1 | 4/2009 | Jiang | |
| 2009/0094817 | A1 | 4/2009 | Killion | |
| 2009/0129609 | A1 | 5/2009 | Oh | |
| 2009/0147967 | A1 | 6/2009 | Ishibashi | |
| 2009/0150149 | A1 | 6/2009 | Cutter | |
| 2009/0161880 | A1 | 6/2009 | Hooley | |
| 2009/0169027 | A1 | 7/2009 | Ura | |
| 2009/0173030 | A1 | 7/2009 | Gulbrandsen | |
| 2009/0173570 | A1 | 7/2009 | Levit | |
| 2009/0226004 | A1 | 9/2009 | Soerensen | |
| 2009/0233545 | A1 | 9/2009 | Sutskover | |
| 2009/0237561 | A1 | 9/2009 | Kobayashi | |
| 2009/0254340 | A1 | 10/2009 | Sun | |
| 2009/0274318 | A1 | 11/2009 | Ishibashi | |
| 2009/0310794 | A1 | 12/2009 | Ishibashi | |
| 2010/0011644 | A1 | 1/2010 | Kramer | |
| 2010/0034397 | A1 | 2/2010 | Nakadai | |
| 2010/0074433 | A1 | 3/2010 | Zhang | |
| 2010/0111323 | A1 | 5/2010 | Marton | |
| 2010/0111324 | A1 | 5/2010 | Yeldener | |
| 2010/0119097 | A1 | 5/2010 | Ohtsuka | |
| 2010/0123785 | A1 | 5/2010 | Chen | |
| 2010/0128892 | A1 | 5/2010 | Chen | |
| 2010/0128901 | A1 | 5/2010 | Herman | |
| 2010/0131749 | A1 | 5/2010 | Kim | |
| 2010/0142721 | A1 | 6/2010 | Wada | |
| 2010/0150364 | A1 | 6/2010 | Buck | |
| 2010/0158268 | A1 | 6/2010 | Marton | |
| 2010/0165071 | A1 | 7/2010 | Ishibashi | |
| 2010/0166219 | A1 | 7/2010 | Marton | |
| 2010/0189275 | A1 | 7/2010 | Christoph | |
| 2010/0189299 | A1 | 7/2010 | Grant | |
| 2010/0202628 | A1 | 8/2010 | Meyer | |
| 2010/0208605 | A1 | 8/2010 | Wang | |
| 2010/0215184 | A1 | 8/2010 | Buck | |
| 2010/0215189 | A1 | 8/2010 | Marton | |
| 2010/0217590 | A1 | 8/2010 | Nemer | |
| 2010/0245624 | A1 | 9/2010 | Beaucoup | |
| 2010/0246873 | A1 | 9/2010 | Chen | |
| 2010/0284185 | A1 | 11/2010 | Ngai | |
| 2010/0305728 | A1 | 12/2010 | Aiso | |
| 2010/0314513 | A1 | 12/2010 | Evans | |
| 2011/0002469 | A1 | 1/2011 | Ojala | |
| 2011/0007921 | A1 | 1/2011 | Stewart | |
| 2011/0033063 | A1 | 2/2011 | Mcgrath | |
| 2011/0038229 | A1 | 2/2011 | Beaucoup | |
| 2011/0096136 | A1 | 4/2011 | Liu | |
| 2011/0096631 | A1 | 4/2011 | Kondo | |
| 2011/0096915 | A1 | 4/2011 | Nemer | |
| 2011/0164761 | A1 | 7/2011 | Mccowan | |
| 2011/0194719 | A1 | 8/2011 | Frater | |
| 2011/0211706 | A1 | 9/2011 | Tanaka | |
| 2011/0235821 | A1 | 9/2011 | Okita | |
| 2011/0268287 | A1 | 11/2011 | Ishibashi | |
| 2011/0311064 | A1 | 12/2011 | Teutsch | |
| 2011/0311085 | A1 | 12/2011 | Stewart | |
| 2011/0317862 | A1 | 12/2011 | Hosoe | |
| 2012/0002835 | A1 | 1/2012 | Stewart | |
| 2012/0014049 | A1 | 1/2012 | Ogle | |

(56) References Cited

U.S. PATENT DOCUMENTS

2012/0027227 A1 2/2012 Kok
2012/0076316 A1 3/2012 Zhu
2012/0080260 A1 4/2012 Stewart
2012/0093344 A1 4/2012 Sun
2012/0117474 A1 5/2012 Miki
2012/0128160 A1 5/2012 Kim
2012/0128175 A1 5/2012 Visser
2012/0155688 A1 6/2012 Wilson
2012/0155703 A1 6/2012 Hernandez-Abrego
2012/0163625 A1 6/2012 Siotis
2012/0169826 A1 7/2012 Jeong
2012/0177219 A1 7/2012 Mullen
2012/0182429 A1 7/2012 Forutanpour
2012/0207335 A1 8/2012 Spaanderman
2012/0224709 A1 9/2012 Keddem
2012/0243698 A1 9/2012 Elko
2012/0262536 A1 10/2012 Chen
2012/0288079 A1 11/2012 Burnett
2012/0288114 A1 11/2012 Duraiswami
2012/0294472 A1 11/2012 Hudson
2012/0327115 A1 12/2012 Chhetri
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1 2/2013 Pandey
2013/0039504 A1 2/2013 Pandey
2013/0083911 A1 4/2013 Bathurst
2013/0094689 A1 4/2013 Tanaka
2013/0101141 A1 4/2013 Mcelveen
2013/0136274 A1 5/2013 Aehgren
2013/0142343 A1 6/2013 Matsui
2013/0147835 A1 6/2013 Hyun
2013/0156198 A1 6/2013 Kim
2013/0182190 A1 7/2013 Mccartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson
2013/0271559 A1 10/2013 Feng
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 Mackey
2014/0016794 A1 1/2014 Lu
2014/0029761 A1 1/2014 Maenpaa
2014/0037097 A1 2/2014 Labosco
2014/0050332 A1 2/2014 Nielsen
2014/0072151 A1 3/2014 Ochs
2014/0098233 A1 4/2014 Martin
2014/0098964 A1 4/2014 Rosca
2014/0122060 A1 5/2014 Kaszczuk
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 11/2014 Lambert
2014/0357177 A1 12/2014 Stewart
2014/0363008 A1 12/2014 Chen
2015/0003638 A1 1/2015 Kasai
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 3/2015 Etter
2015/0078582 A1 3/2015 Graham
2015/0097719 A1 4/2015 Balachandreswaran
2015/0104023 A1 4/2015 Bilobrov
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0181018 A1 * 6/2015 Mani .................... H04M 9/082
379/406.08
2015/0185825 A1 7/2015 Mullins
2015/0189423 A1 7/2015 Giannuzzi
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Virolainen
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto
2016/0055859 A1 2/2016 Finlow-Bates
2016/0080867 A1 3/2016 Nugent
2016/0088392 A1 3/2016 Huttunen
2016/0100092 A1 4/2016 Bohac
2016/0105473 A1 4/2016 Klingbeil
2016/0111109 A1 4/2016 Tsujikawa
2016/0127527 A1 5/2016 Mani
2016/0134928 A1 5/2016 Ogle
2016/0142548 A1 5/2016 Pandey
2016/0142814 A1 5/2016 Deroo
2016/0142815 A1 5/2016 Norris
2016/0148057 A1 5/2016 Oh
2016/0150315 A1 5/2016 Tzirkel-Hancock
2016/0150316 A1 5/2016 Kubota
2016/0155455 A1 6/2016 Ojanperä
2016/0165340 A1 6/2016 Benattar
2016/0173976 A1 6/2016 Podhradsky
2016/0173978 A1 6/2016 Li
2016/0189727 A1 6/2016 Wu
2016/0192068 A1 6/2016 Ng
2016/0196836 A1 7/2016 Yu
2016/0234593 A1 8/2016 Matsumoto
2016/0249132 A1 8/2016 Oliaei
2016/0275961 A1 9/2016 Yu
2016/0295279 A1 10/2016 Srinivasan
2016/0300584 A1 10/2016 Pandey
2016/0302002 A1 10/2016 Lambert
2016/0302006 A1 10/2016 Pandey
2016/0323667 A1 11/2016 Shumard
2016/0323668 A1 11/2016 Abraham
2016/0330545 A1 11/2016 Mcelveen
2016/0337523 A1 11/2016 Pandey
2016/0353200 A1 12/2016 Bigeh
2016/0357508 A1 12/2016 Moore
2017/0019744 A1 1/2017 Matsumoto
2017/0064451 A1 3/2017 Park
2017/0105066 A1 4/2017 Mclaughlin
2017/0134849 A1 5/2017 Pandey
2017/0134850 A1 5/2017 Graham
2017/0164101 A1 6/2017 Rollow, IV

(56) References Cited

U.S. PATENT DOCUMENTS

| | | | |
|---|---|---|---|
| 2017/0180861 | A1 | 6/2017 | Chen |
| 2017/0206064 | A1 | 7/2017 | Breazeal |
| 2017/0230748 | A1 | 8/2017 | Shumard |
| 2017/0264999 | A1 | 9/2017 | Fukuda |
| 2017/0303887 | A1 | 10/2017 | Richmond |
| 2017/0308352 | A1 | 10/2017 | Kessler |
| 2017/0374454 | A1 | 12/2017 | Bernardini |
| 2018/0083848 | A1 | 3/2018 | Siddiqi |
| 2018/0102136 | A1 | 4/2018 | Ebenezer |
| 2018/0109873 | A1 | 4/2018 | Xiang |
| 2018/0115799 | A1 | 4/2018 | Thiele |
| 2018/0160224 | A1 | 6/2018 | Graham |
| 2018/0196585 | A1 | 7/2018 | Densham |
| 2018/0205830 | A1* | 7/2018 | Wells-Rutherford ........................ H04M 3/568 |
| 2018/0219922 | A1 | 8/2018 | Bryans |
| 2018/0227666 | A1 | 8/2018 | Barnett |
| 2018/0292079 | A1 | 10/2018 | Branham |
| 2018/0310096 | A1 | 10/2018 | Shumard |
| 2018/0313558 | A1 | 11/2018 | Byers |
| 2018/0338205 | A1 | 11/2018 | Abraham |
| 2018/0359565 | A1 | 12/2018 | Kim |
| 2019/0042187 | A1 | 2/2019 | Truong |
| 2019/0166424 | A1 | 5/2019 | Harney |
| 2019/0215540 | A1 | 7/2019 | Nicol |
| 2019/0230436 | A1 | 7/2019 | Tsingos |
| 2019/0259408 | A1 | 8/2019 | Freeman |
| 2019/0268683 | A1 | 8/2019 | Miyahara |
| 2019/0295540 | A1 | 9/2019 | Grima |
| 2019/0295569 | A1 | 9/2019 | Wang |
| 2019/0319677 | A1 | 10/2019 | Hansen |
| 2019/0371354 | A1 | 12/2019 | Lester |
| 2019/0373362 | A1 | 12/2019 | Ansai |
| 2019/0385629 | A1 | 12/2019 | Moravy |
| 2019/0387311 | A1 | 12/2019 | Schultz |
| 2020/0015021 | A1 | 1/2020 | Leppanen |
| 2020/0021910 | A1 | 1/2020 | Rollow, IV |
| 2020/0027472 | A1 | 1/2020 | Huang |
| 2020/0037068 | A1 | 1/2020 | Barnett |
| 2020/0068297 | A1 | 2/2020 | Rollow, IV |
| 2020/0100009 | A1 | 3/2020 | Lantz |
| 2020/0100025 | A1 | 3/2020 | Shumard |
| 2020/0137485 | A1 | 4/2020 | Yamakawa |
| 2020/0145753 | A1 | 5/2020 | Rollow, IV |
| 2020/0152218 | A1 | 5/2020 | Kikuhara |
| 2020/0162618 | A1 | 5/2020 | Enteshari |
| 2020/0228663 | A1 | 7/2020 | Wells-Rutherford |
| 2020/0251119 | A1 | 8/2020 | Yang |
| 2020/0275204 | A1 | 8/2020 | Labosco |
| 2020/0278043 | A1 | 9/2020 | Cao |
| 2020/0288237 | A1 | 9/2020 | Abraham |
| 2021/0012789 | A1 | 1/2021 | Husain |
| 2021/0021940 | A1 | 1/2021 | Petersen |
| 2021/0044881 | A1 | 2/2021 | Lantz |
| 2021/0051397 | A1 | 2/2021 | Veselinovic |
| 2021/0098014 | A1 | 4/2021 | Tanaka |
| 2021/0098015 | A1 | 4/2021 | Pandey |
| 2021/0120335 | A1 | 4/2021 | Veselinovic |
| 2021/0200504 | A1 | 7/2021 | Park |
| 2021/0375298 | A1 | 12/2021 | Zhang |

FOREIGN PATENT DOCUMENTS

| | | |
|---|---|---|
| CA | 2505496 | 10/2006 |
| CA | 2838856 | 12/2012 |
| CA | 2846323 | 9/2014 |
| CN | 1780495 | 5/2006 |
| CN | 101217830 | 7/2008 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106251857 | 12/2016 |
| CN | 106851036 | 6/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |
| DE | 2941485 | 4/1981 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3035556 | 6/2016 |
| EP | 3131311 | 2/2017 |
| GB | 2393601 | 3/2004 |
| GB | 2446620 | 8/2008 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |

(56) References Cited

FOREIGN PATENT DOCUMENTS

| | | |
|---|---|---|
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |

OTHER PUBLICATIONS

Burton, et al., "A New Structure for Combining Echo Cancellation and Beamforming in Changing Acoustical Environments," IEEE International Conference on Acoustics, Speech and Signal Processing, 2007, pp. 1-77-1-80.

BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.

Cabral, et al., Glottal Spectral Separation for Speech Synthesis, IEEE Journal of Selected Topics in Signal Processing, 2013, 15 pp.

Campbell, "Adaptive Beamforming Using a Microphone Array for Hands-Free Telephony," Virginia Polytechnic Institute and State University, Feb. 1999, 154 pgs.

Canetto, et al., "Speech Enhancement Systems Based on Microphone Arrays," VI Conference of the Italian Society for Applied and Industrial Mathematics, May 27, 2002, 9 pp.

Cech, et al., "Active-Speaker Detection and Localization with Microphones and Cameras Embedded into a Robotic Head," IEEE-RAS International Conference on Humanoid Robots, Oct. 2013, pp. 203-210.

Chan, et al., "Uniform Concentric Circular Arrays with Frequency-Invariant Characteristics—Theory, Design, Adaptive Beamforming and DOA Estimation," IEEE Transactions on Signal Processing, vol. 55, No. 1, Jan. 2007, pp. 165-177.

Chau, et al., "A Subband Beamformer on an Ultra Low-Power Miniature DSP Platform," 2002 IEEE International Conference on Acoustics, Speech, and Signal Processing, 4 pp.

Chen, et al., "A General Approach to the Design and Implementation of Linear Differential Microphone Arrays," Signal and Information Processing Association Annual Summit and Conference, 2013 Asia-Pacific, IEEE, 7 pp.

Chen, et al., "Design and Implementation of Small Microphone Arrays," PowerPoint Presentation, Northwestern Polytechnical University and Institut national de la recherche scientifique, Jan. 1, 2014, 56 pp.

Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.

Chou, "Frequency-Independent Beamformer with Low Response Error," 1995 International Conference on Acoustics, Speech, and Signal Processing, pp. 2995-2998, May 9, 1995, 4 pp.

Chu, "Desktop Mic Array for Teleconferencing," 1995 International Conference on Acoustics, Speech, and Signal Processing, May 1995, pp. 2999-3002.

ClearOne Introduces Ceiling Microphone Array With Built-In Dante Interface, Press Release; GlobeNewswire, Jan. 8, 2019, 2 pp.

ClearOne Launches Second Generation of its Groundbreaking Beamforming Microphone Array, Press Release, Acquire Media, Jun. 1, 2016, 2 pp.

ClearOne to Unveil Beamforming Microphone Array with Adaptive Steering and Next Generation Acoustic Echo Cancellation Technology, Press Release, InfoComm, Jun. 4, 2012, 1 p.

ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.

ClearOne, Beamforming Microphone Array, Mar. 2012, 6 pgs.

ClearOne, Ceiling Microphone Array Installation Manual, Jan. 9, 2012, 20 pgs.

ClearOne, Converge/Converge Pro, Manual, 2008, 51 pp.

Coleman, "Loudspeaker Array Processing for Personal Sound Zone Reproduction," Centre for Vision, Speech and Signal Processing, 2014, p. 1-p. 131.

Cook, et al., An Alternative Approach to Interpolated Array Processing for Uniform Circular Arrays, Asia-Pacific Conference on Circuits and Systems, 2002, pp. 411-414.

Cox, et al., "Robust Adaptive Beamforming," IEEE Trans. Acoust., Speech, and Signal Processing, vol. ASSP-35, No. 10, Oct. 1987, pp. 1365-1376.

CTG Audio, Ceiling Microphone CTG CM-01, Jun. 5, 2008, 2 pgs.

CTG Audio, CM-01 & CM-02 Ceiling Microphones Specifications, 2 pgs.

CTG Audio, CM-01 & CM-02 Ceiling Microphones, 2017, 4 pgs.

CTG Audio, CTG FS-400 and RS-800 with "Beamforming" Technology, Datasheet, As early as 2009, 2 pp.

CTG Audio, CTG User Manual for the FS-400/800 Beamforming Mixers, Nov. 2008, 26 pp.

CTG Audio, Expand Your IP Teleconferencing to Full Room Audio, Obtained from website htt. ):/www ct audio com/ex and-, our-i -teleconferencino-to-ful-room-audio-while-conquennc.1-echo-cancelation-issues Mull, 2014.

CTG Audio, Frequently Asked Questions, As early as 2009, 2 pp.

CTG Audio, Installation Manual, Nov. 21, 2008, 25 pgs.

CTG Audio, Introducing the CTG FS-400 and FS-800 with Beamforming Technology, As early as 2008, 2 pp.

(56) References Cited

OTHER PUBLICATIONS

CTG Audio, Meeting the Demand for Ceiling Mics in the Enterprise 5 Best Practices, Brochure, 2012, 9 pp.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase. et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAIaIQobChMI2JTw-Ynm6AIVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. On Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. On Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al, "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, p. 1-p. 61.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, 1128SYSM IP Compliant Loudspeaker System with Microphone Data Sheet, 2009, 2 pgs.
Atlas Sound, 1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFKAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et. Al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.

(56) References Cited

OTHER PUBLICATIONS

Beyer Dynamic, Classis BM 32-33-34 DE-EN-FR 2016, 1 pg.
Beyer Dynamic, Classis-BM-33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2280 Reference Manual, 2001, 60 pp.
Pomona, Model 3306, Datasheet, Jun. 9, 1999, 1 p.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, TeamConnect Ceiling, https://en-us.sennheiser.com/conference-meeting-rooms-teamconnect-ceiling, 2017, 7 pgs.
SerDes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 1, No. 2, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pp. 2009-2017.
Shure, New MXA910 Variant Now Available, Press Release, Dec. 13, 2019, 5 pp.
Shure, Q&A in Response to Recent US Court Ruling on Shure MXA910, Available at <https://www.shure.com/en-US/meta/legal/q-and-a-inresponse-to-recent-us-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, As early as 2020, 12 pp.
Signal Processor MRX7-D Product Specifications, Yamaha Corporation, 2016. 12 pages.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.

(56) References Cited

OTHER PUBLICATIONS

SM 69 Stereo Microphone, Datasheet, Georg Neumann GmbH, Available at <https://ende.neumann.com/product_files/6552/download>, 1 p.
Soda et al., Introducing Multiple Microphone Arrays for Enhancing Smart Home Voice Control, The Institute of Electronics, Information and Communication Engineers, Technical Report of IEICE, Jan. 2013, 6 pgs.
Soundweb London Application Guides, BSS Audio, 2010, 120 pages.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. On Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.
Gritton et al., Echo Cancellation Algorithms, IEEE Assp Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforming and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview, Renkus-Heinz, Dec. 24, 2018, 2 pp.
International Search Report and Written Opinion for PCT/US2016/022773 dated Jun. 10, 2016.
International Search Report and Written Opinion for PCT/US2016/029751 dated Nov. 28, 2016, 21 pp.
International Search Report and Written Opinion for PCT/US2018/013155 dated Jun. 8, 2018.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Symetrix, Inc., SymNet Network Audio Solutions Brochure, 2008, 32 pgs.
SymNet Network Audio Solutions Brochure, Symetrix, Inc., 2008.

(56) References Cited

OTHER PUBLICATIONS

Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, Sensors, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE Assp Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "Loud: A 1020-Node Microphone Array and Acoustic Beamformer," 14th International Congress on Sound & Vibration, Jul. 2007, 8 pgs.
Weinstein, et al., "Loud: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp, 2007.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.

(56) References Cited

OTHER PUBLICATIONS

Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. 1-281-1-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), INRIA Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. On Signal Processing, vol. 49, No. 2, Feb. 2001, pp. 290-300.

* cited by examiner

MASK NON-LINEAR PROCESSOR FOR ACOUSTIC ECHO CANCELLATION

CROSS-REFERENCE TO RELATED APPLICATION

This application claims the benefit of and priority to U.S. Provisional Patent Application No. 63/260,750, filed on Aug. 31, 2021, the contents of which are incorporated herein in their entirety.

TECHNICAL FIELD

This application generally relates to a non-linear processor used in an acoustic echo cancellation system.

BACKGROUND

Conferencing environments, such as boardrooms, conferencing settings, and the like, can involve the use of microphones (including microphone arrays) for capturing sound from audio sources and loudspeakers for presenting audio from a remote location (also known as a far end). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. Multiple microphones may be used in order to optimally capture the speech and sound in the conference room.

However, the microphones may pick up the speech and sound from the remote location that is played on the loudspeakers. In this situation, the audio transmitted to the remote location may therefore include an echo, e.g., the speech and sound from the conference room as well as the speech and sound from the remote location. If there is no correction, the audio transmitted to the remote location may be low quality or unacceptable because of this echo. In particular, it would not be desirable for persons at the remote location to hear their own speech and sound. Typical acoustic echo cancellation systems utilize an adaptive filter, e.g., a finite impulse response filter, on the remote audio signal to generate a filtered signal that can be subtracted from the local microphone signal to remove linear echo.

SUMMARY

The techniques of this disclosure are directed to solving the above-noted problems by providing systems and methods that are designed to, among other things: (1) generate a continuous mask value that can be used as a gain of a non-linear processor, based on: an adaptation state of the adaptive filter, a coherence of a microphone signal and a filtered remote audio signal, and a comparison of the microphone signal and the filtered remote audio signal with respect to a threshold of the non-linear processor; (2) determine the adaptation state of the adaptive filter based on the microphone signal and the filtered remote audio signal using a convergence integrator; and (3) utilize communication between a loudspeaker and the non-linear processor to adjust the threshold of the non-linear processor when the loudspeaker is active to help suppress far end single talk leakage.

In an embodiment, a device may include at least one processor configured to adaptively filter, with an adaptive filter, a remote audio signal to a filtered remote audio signal; adaptively filter, with an adaptive filter, a remote audio signal to a filtered remote audio signal; generate, with a non-linear processor, a mask value usable as a gain of the non-linear processor; multiply the mask value with an initial echo-cancelled audio signal to generate a final echo-cancelled audio signal; and output the final echo-cancelled audio signal. The generation of the mask value may be based on: the adaptation state of the adaptive filter, a coherence of the microphone signal and the filtered remote audio signal, and a comparison of the microphone signal and the filtered remote audio signal with respect to a threshold of the non-linear processor.

In another embodiment, a system may include a microphone, a loudspeaker, and at least one processor. The microphone and the loudspeaker may be located in the same housing. The at least one processor may be configured to estimate, with an estimator, an adaptation state of the adaptive filter based on a microphone signal and a filtered remote audio signal; and generate, with a non-linear processor, a mask value usable as a gain of the non-linear processor. The generation of the mask value may be based on: the adaptation state of the adaptive filter, the microphone signal, and the filtered remote audio signal.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
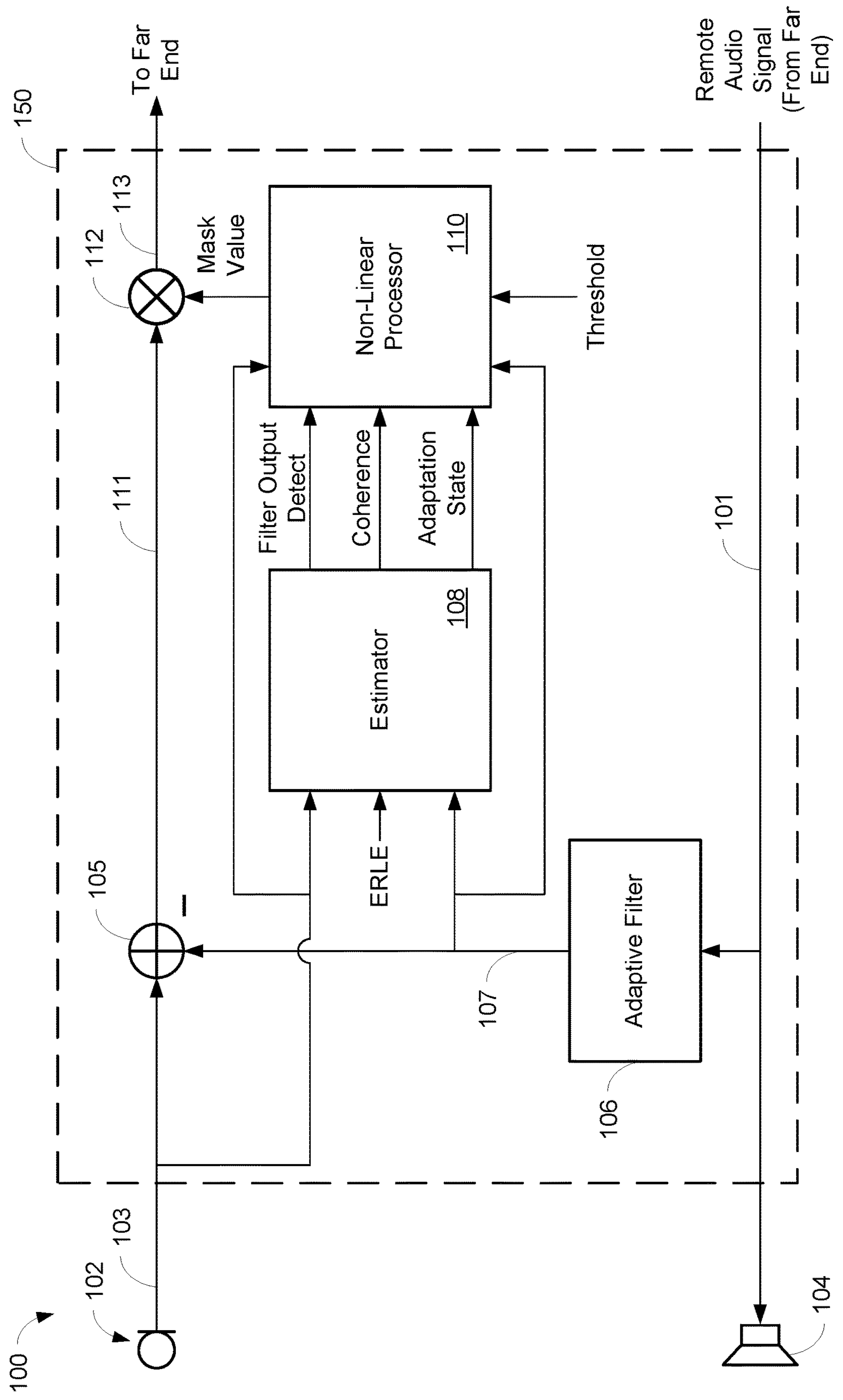
FIG. 1 is a schematic diagram of a communication system including an acoustic echo cancellation system that includes an estimator and a non-linear processor, in accordance with some embodiments.

The systems and methods described herein can generate a continuous mask value that can be used as a gain of a non-linear processor. A non-linear processor can be utilized to remove residual echo that cannot be removed by an adaptive filter, and to ultimately generate an echo-cancelled audio signal that can be transmitted back to the far end. The non-linear processor may calculate a gain to suppress the residual echo in particular frequency bands. In addition, a threshold of the non-linear processor may be adjustable, e.g., by a user, to denote a minimum signal level that can be suppressed by the non-linear processor. Existing non-linear processors in typical acoustic echo cancellation systems can only calculate a gain of either 0 or 1. That is, the gain in these existing non-linear processors may be calculated as 0 (e.g., residual echo is fully suppressed), or as 1 (e.g., no residual echo suppression occurs). However, full suppression of residual echo (e.g., when the gain is 0) may cause unintended attenuation of desired sound (e.g., near end voice) in certain situations.

The mask value may be generated as a value on a continuum between 0 and 1. The generated mask value may be used as a gain of the non-linear processor in order to make the gain more precise, which can result in more optimal suppression of residual echo and better overall acoustic echo cancellation. For example, desired sound captured by a microphone may not be unintentionally attenuated using a non-linear processor that has a more precise calculated gain.

Other systems and methods described herein can adjust a threshold of the non-linear processor when a loudspeaker is active. For example, when a microphone is physically close to a loudspeaker, there may be an unacceptable increase in the far end single talk leakage that cannot be suppressed by a typical non-linear processor in existing acoustic echo cancellation systems. Far end single talk describes a scenario when only the far end remote participant is speaking and the far end audio is captured by the microphone. However, far end single talk leakage can occur in situations when the microphone is physically close to the loudspeaker, such as when the far end audio may be captured by the microphone with a greater energy level that a typical non-linear processor cannot consistently suppress (particularly in low frequency sub-bands).

The threshold of the non-linear processor can be adjusted when the loudspeaker is active to help suppress far end single talk leakage. For example, the threshold of a lower frequency sub-band of a non-linear processor can be increased when the loudspeaker is active, particularly in situations where the loudspeaker and the microphone are physically proximate. Through use of the acoustic echo cancellation system and the non-linear processor systems and methods described herein, the removal of residual echo by the non-linear processor may be improved and the overall acoustic echo cancellation performance may be enhanced.

FIG. 1 is a schematic diagram of a communication system 100 for capturing sound from audio sources in an environment using a microphone 102 and presenting audio from a remote location using a loudspeaker 104. The communication system 100 may include an acoustic echo cancellation system 150 that includes an adaptive filter 106, an estimator 108, and a non-linear processor 110. A mask value may be generated by the non-linear processor 110 that can be used as the gain of the non-linear processor 110, which can result in more optimal suppression of residual echo and better overall acoustic echo cancellation, and is described in more detail below.

The communication system 100 may generate an echo-cancelled audio signal 113 using the acoustic echo canceller system. The echo-cancelled audio signal 113 may mitigate the sound received from the remote location that is played on the loudspeaker 104, and in particular, mitigate linear echo and residual echo that is sensed by the microphone 102. In this way, the echo-cancelled audio signal 113 may be transmitted to the remote location without the undesirable echo of persons at the remote location hearing their own speech and sound.

Environments such as conference rooms may utilize the communication system 100 to facilitate communication with persons at the remote location, for example. The type of microphone 102 and its placement in a particular environment may depend on the locations of audio sources, physical space requirements, aesthetics, room layout, and/or other considerations. For example, in some environments, the microphone 102 may be placed on a table or lectern near the audio source. In other environments, the microphone 102 may be mounted overhead to capture the sound from the entire room, for example. The communication system 100 may work in conjunction with any type and any number of microphones 102.

Various components included in the communication system 100 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc. In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others).

Figure 2:
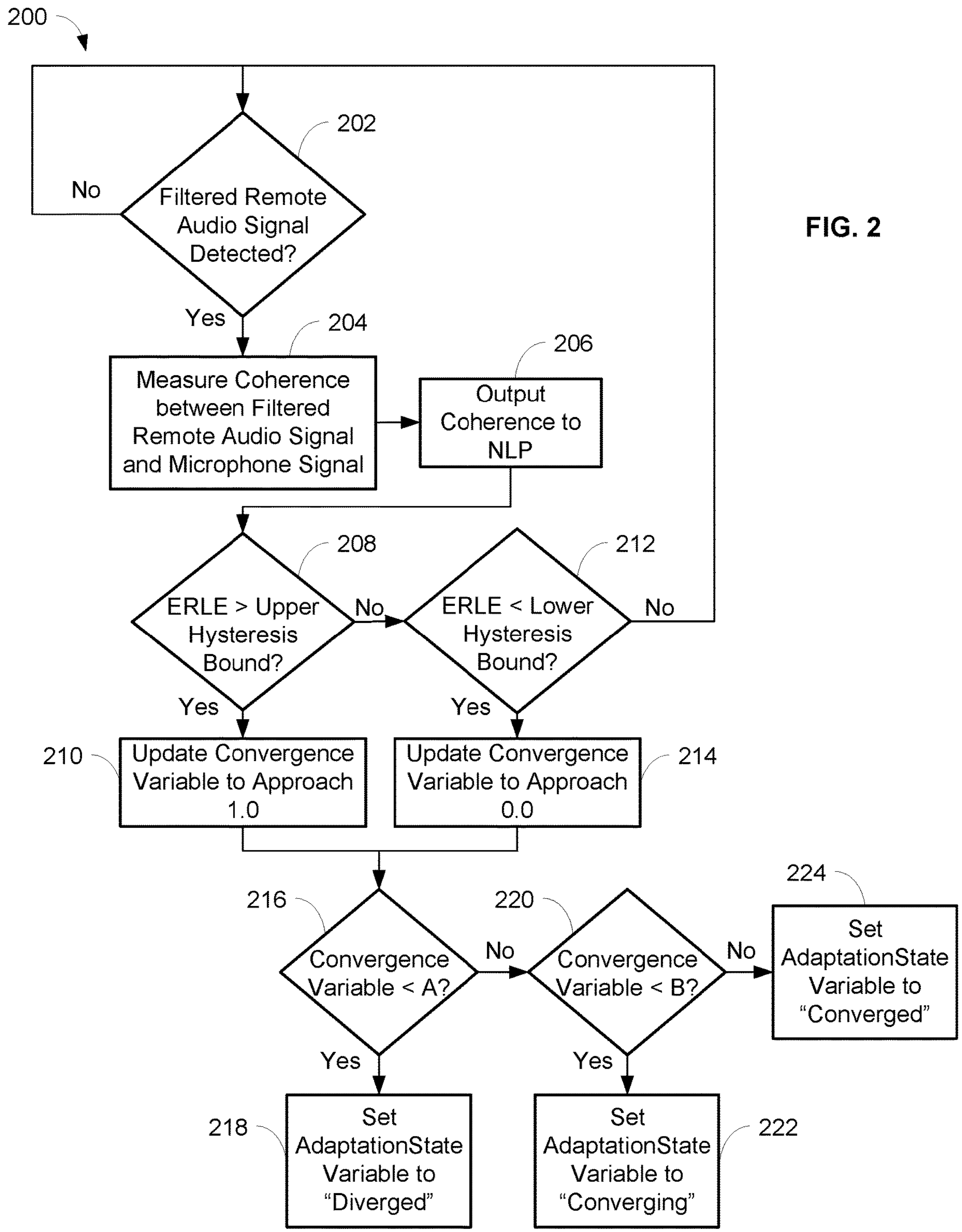
FIG. 2 is a flowchart illustrating operations for determining an adaptation state of an adaptive filter using the estimator of the acoustic echo cancellation system of FIG. 1, in accordance with some embodiments.
Figure 3:
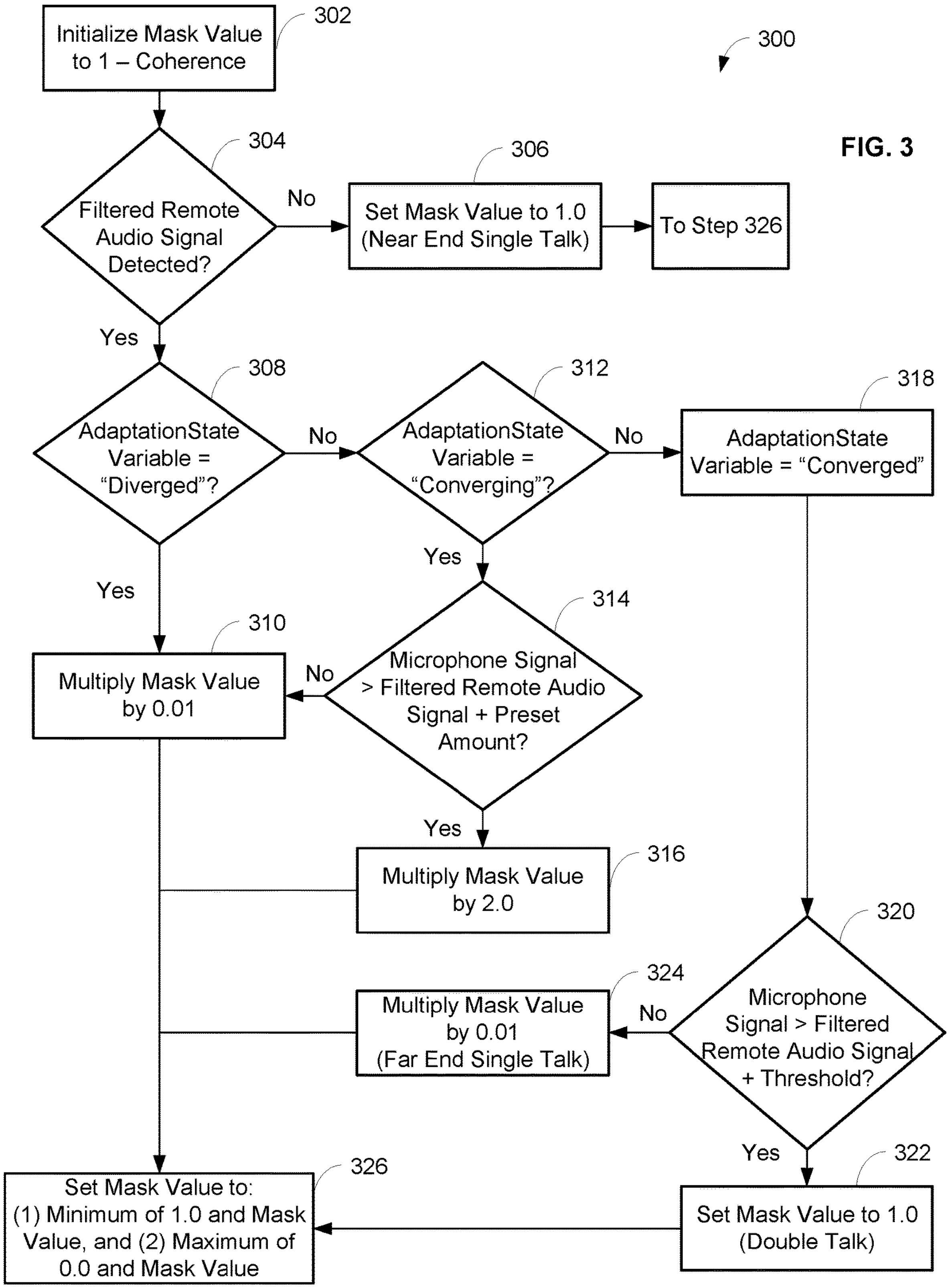
FIG. 3 is a flowchart illustrating operations for generating a mask value that can be used as a gain of the non-linear processor in the acoustic echo cancellation system of FIG. 1, in accordance with some embodiments.

FIGS. 2-3 illustrate methods for utilizing the communication system 100 and the acoustic echo cancellation system 150. In particular, FIG. 2 illustrates a process 200 for determining an adaptation state of the adaptive filter 106 using an estimator 108. FIG. 3 illustrates a process 300 for generating a mask value that that can be used as a gain of the non-linear processor 110, based on the adaptation state of the adaptive filter 106 and other signals, as described in more detail below.

Referring to FIG. 1, the microphone 102 may detect sound in the environment and convert the sound to an audio signal 103. In embodiments, the audio signal 103 from the microphone 102 may be processed by a beamformer (not shown) to generate one or more beamformed audio signals. Accordingly, while the systems and methods are described herein as using an audio signal 103 from microphone 102, it is contemplated that the systems and methods may also utilize any type of acoustic source, such as beamformed audio signals generated by a beamformer. In addition or alternatively, the audio signal 103 from the microphone 102 and the remote audio signal 101 may be converted into the frequency domain, in which case, the acoustic echo cancellation system 150 can operate in the frequency domain.

The adaptive filter 106 may process the remote audio signal 101 to generate a filtered remote audio signal 107 that is an estimate of the acoustic path of the remote audio signal 101, e.g., a model of the echo that will be detected by the microphone 102. In embodiments, the adaptive filter 106 may be a finite impulse response filter. The filtered remote audio signal 107 generated by the adaptive filter 106 may be subtracted from the audio signal 103 of the microphone 102 at the summing point 105 to generate an initial echo-cancelled audio signal 111. Linear echo in the microphone audio signal 103 may be suppressed in the initial echo-cancelled audio signal 111.

As shown in the process 200 of FIG. 2 for determining an adaptation state of the adaptive filter 106, the estimator 108 may process the microphone audio signal 103 and the filtered remote audio signal 107 to determine the adaptation state of the adaptive filter 106. In some embodiments, there may be multiple microphones 102 with associated estimators 108. In other embodiments, there may be an estimator 108 for each of several frequency bands. At step 202, the estimator 108 can detect whether there is an active filtered remote audio signal 107. There may be an active filtered remote audio signal 107, for example, when there is activity on the remote audio signal 101, such as speech or other sound from the remote location that is subsequently filtered by the adaptive filter 106. If a filtered remote audio signal 107 is not detected at step 202 ("NO" branch of step 202), then the process 200 may remain at step 202 until a filtered remote audio signal 107 is detected.

However, if a filtered remote audio signal 107 is detected at step 202 ("YES" branch of step 202), then the process 200 continues to step 204. At step 204, the estimator 108 may measure the coherence between the filtered remote audio signal 107 and the microphone audio signal 103. The coherence is a measure of the relationship between the frequency content of the filtered remote audio signal 107 and the microphone audio signal 103 from the microphone 102. At step 206, the measured coherence can be output from the estimator 108 to the non-linear processor 110.

At step 208, it can be determined whether the echo return loss enhancement (ERLE) metric of the acoustic echo cancellation system 150 is greater than an upper hysteresis bound, such as 1 dB, for example. The ERLE metric is a measure of the performance of the overall acoustic echo cancellation system 150, and may indicate how much echo has been attenuated from the microphone audio signal 103. In particular, ERLE may be defined as the ratio of the summation of the input magnitude frequency bands (of the microphone audio signal 103) to the summation of the output magnitude frequency bands. For purposes of ERLE, the output signal may be measured after being processed by the non-linear processor 110, but before any noise reduction. If the ERLE metric is greater than the upper hysteresis bound at step 208 ("YES" branch of step 208), then at step 210, an intermediate variable indicating the convergence of the adaptive filter 106 may be updated to approach 1.0. In embodiments, the estimator 108 may utilize a convergence integrator to update the convergence variable to approach 1.0.

However, if the ERLE metric is not greater than the upper hysteresis bound at step 208 ("NO" branch of step 208), then the process 200 may continue to step 212. At step 212, it can be determined whether the ERLE metric of the acoustic echo cancellation system 150 is less than a lower hysteresis bound, such as −1 dB, for example. If the ERLE metric is less than the lower hysteresis bound at step 212 ("YES" branch of step 212), then at step 214, the intermediate variable denoting the convergence of the adaptive filter 106 may be updated to approach 0.0. In embodiments, the estimator 108 may utilize a convergence integrator to update the convergence variable to approach 0.0. If the ERLE metric is not less than the lower hysteresis bound at step 212 ("NO" branch of step 212), then the convergence variable is not updated and the process 200 may return to step 202 for detecting a filtered remote audio signal 107.

From step 210 or step 214 based on the convergence variable being updated, the process 200 may continue to compare the convergence variable to comparison thresholds A and B. The comparison thresholds A and B may be in the range of 0.0 to 1.0 and may be used to determine the adaptation state of the adaptive filter 106. At step 216, it may be determined whether the convergence variable is less than a comparison threshold A, such as 0.25, for example. If the convergence variable is less than the predetermined threshold A at step 216 ("YES" branch of step 216), then at step 218, the adaptation state of the adaptive filter 106 may be assigned as "Diverged". A "Diverged" adaptation state of the adaptive filter 106 can indicate that the adaptive filter 106 has not yet identified the residual echo and is therefore not actively suppressing the residual echo.

However, if the convergence variable is not less than the predetermined threshold A at step 216 ("NO" branch of step 216), then the process 200 continues to step 220. At step 220, it may be determined whether the convergence variable is less than a predetermined threshold B, such as 0.5, for example. If the convergence variable is less than the predetermined threshold B at step 220 ("YES" branch of step 220), then at step 222, the adaptation state of the adaptive filter 106 may be assigned as "Converging". A "Converging" adaptation state of the adaptive filter 106 may indicate that the adaptive filter 106 has started to identify the residual echo and is suppressing at least part of the residual echo.

Finally, if the convergence variable is not less than the predetermined threshold B at step 220 ("NO" branch of step 220), then the process 200 continues to step 224 where the adaptation state of the adaptive filter 106 may be assigned as "Converged". A "Converged" adaptation state of the adaptive filter 106 may indicate that the adaptive filter 106 has identified the residual echo and is suppressing the residual echo.

FIG. 3 shows a process 300 for the non-linear processor 110 to generate a mask value that can be used as a gain of the non-linear processor 110. The mask value may be generated to be a value on a continuum between 0 and 1, in embodiments. In the process 300, the non-linear processor 110 may generate a mask value based on several signals: the microphone audio signal 103 (from microphone 102), the filtered remote audio signal 107 (from adaptive filter 106), whether the filtered remote audio signal has been detected (from the estimator 108), the coherence between the filtered remote audio signal 107 and the microphone audio signal 103 (from the estimator 108), the adaptation state of the adaptive filter 106 (from the estimator 108), and a threshold of the non-linear processor 110. In embodiments, the threshold of the non-linear processor 110 may be set by a user by setting the level of the non-linear processor 110, such as through a graphical user interface or other control interface. The level of the non-linear processor 110 may be set to one of a number of preset settings, e.g., low, medium, or high. The threshold of the non-linear processor 110 may denote the minimum level of a signal that will be suppressed by the non-linear processor 110, and may be used by the non-linear processor 110 in the comparison of the microphone audio signal 103 to the filtered remote audio signal 107 on a per sub-band basis.

At step 302, the mask value may be initialized, such as to a value of one minus the coherence measurement that was performed at step 204 of the process 200 described above. The mask value may be initialized to this value due to the coherence measurement being naturally in the range of 0.0 to 1.0, which therefore allows the mask value to also be in the range of 0.0 to 1.0. A range of 0.0 to 1.0 may be an ideal range for an attenuation variable, in embodiments. In addition, the mask value may be initialized to one minus the coherence measurement because coherence and non-linear processing attenuation are directly related. In particular, when the coherence measurement is higher, then the attenuation by the non-linear processor 110 may also be higher.

At step 304, it can be determined whether an active filtered remote audio signal 107 has been detected. In embodiments, whether an active filtered remote audio signal 107 has been detected may have been determined at step 202 of the process 200 described above, and transmitted from the estimator 108 to the non-linear processor 110 for use at step 304. If an active filtered remote audio signal 107 has not been detected at step 304 ("NO" branch of step 304), then the process 300 may continue to step 306. At step 306, the mask value may be set to 1.0 and the state of the communication system 100 may be denoted as near end single talk, e.g., there is only near end activity and there is no far end activity (e.g., no activity on the remote audio signal 101). When the mask value is set to 1.0, there will be no change to the gain of the non-linear processor 110. The process 300 may continue to step 326 to set the final mask value, which is described in more detail below.

However, if an active filtered remote audio signal 107 has been detected at step 304 ("YES" branch of step 304), then the process 300 may continue to step 308. At step 308, it may be determined whether the adaptation state of the adaptive filter 106 is in a "Diverged" state, such as at step 218 of the process 200 described previously. If it is determined at step 308 that the adaptation state of the adaptive filter 106 is in a "Diverged" state ("YES" branch of step 308), then at step 310 the initialized mask value may be multiplied by a relatively small value (e.g., 0.01) to increase the attenuation of residual echo performed by the non-linear processor 110. The process 300 may continue to step 326 where the final mask value may be set. If it is determined at step 308 that the adaptation state of the adaptive filter 106 is not in a "Diverged" state ("NO" branch of step 308), then the process 300 may continue to step 312.

At step 312, it may be determined whether the adaptation state of the adaptive filter 106 is in a "Converging" state, such as at step 222 of the process 200 described previously. If it is determined at step 312 that the adaptation state of the adaptive filter 106 is in a "Converging" state ("YES" branch of step 312), then the process 300 may continue to step 314. At step 314, it may be determined whether the level of the microphone audio signal 103 is greater than the level of the filtered remote audio signal 107 plus a preset amount (e.g., by a factor of 4 over the level of the filtered remote audio signal 107). The preset amount utilized in the comparison may be selected to have a comparison that is higher than the thresholds used for levels (e.g., low, medium, or high) of the non-linear processor 110 when the adaptation state of the adaptive filter 106 is in a "Converged" state. In this way, a higher likelihood of suppression of residual echo may occur when the adaptation state of the adaptive filter 106 is in a "Converging" state. This is in contrast to when the adaptation state of the adaptive filter 106 is in a "Converged" state, which is when it is less desirable to perform suppression.

If the level of the microphone audio signal 103 is not greater than the level of the filtered remote audio signal 107 plus the preset amount at step 314 ("NO" branch of step 314), then the process 300 may continue to step 310 so that the initialized mask value may be multiplied by a relatively small value (e.g., 0.01) to increase the attenuation of residual echo performed by the non-linear processor 110. However, if the level of the microphone audio signal 103 is greater than the level of the filtered remote audio signal 107 plus the preset amount at step 314 ("YES" branch of step 314), then the process 300 may continue to step 316 to multiply the initialized mask value by a relatively large value (e.g., 2.0) to decrease the attenuation of residual echo performed by the non-linear processor 110. From step 310 or step 316, the process 300 may continue to step 326 where the final mask value may be set.

Returning to step 312, it may be determined that the adaptation state of the adaptive filter 106 is not in a "Converging" state ("NO" branch of step 312). In this case, the process 300 may continue to step 318 where the adaptation state of the adaptive filter 106 is determined to be in a "Converged state", such as at step 224 of the process 200 described previously. This is because there are three possible adaptation states of the adaptive filter 106 that can be assigned in the process 200. As such, in the process 300, if it has been determined that the adaptation state of the adaptive filter 106 is not in a "Diverged" state (at step 308) or a "Converging" state (at step 312), then the adaptation state of the adaptive filter 106 is in a "Converged" state (at step 318).

At step 320, it may be determined whether the level of the microphone audio signal 103 is greater than the level of the filtered remote audio signal 107 plus the threshold of the non-linear processor 110. If the level of the microphone audio signal 103 is greater than the level of the filtered remote audio signal 107 plus the threshold of the non-linear processor 110 at step 320 ("YES" branch of step 320), then at step 322, the mask value may be set to 1.0 and the state of the communication system 100 may be denoted as double talk, e.g., there is simultaneous near end activity and far end activity. When the mask value is set to 1.0, there will be no change to the gain of the non-linear processor 110.

However, if the level of the microphone audio signal 103 is not greater than the level of the filtered remote audio signal 107 plus the threshold of the non-linear processor 110 at step 320 ("NO" branch of step 320), then at step 324, the initialized mask value may be multiplied by a relatively small value (e.g., 0.01) to increase the attenuation of residual echo performed by the non-linear processor 110. In addition, the state of the communication system 100 may be denoted as far end single talk, e.g., there is only far end activity and there is no near end activity. From step 322 or step 324, the process 300 may continue to step 326 where the final mask value may be set. It should be noted that the values that the initialized mask value may be multiplied by (e.g., at steps 310, 316, and 324) are exemplary and may be other appropriate values.

The process 300 may reach step 326 following each of steps 306, 310, 316, 322, or 324, as discussed above. At step 326, the final mask value may be set by the process 300 to be constrained between 0.0 and 1.0 based on the following limitations: (1) the minimum of 1.0 and the current mask value, and (2) the maximum of 0.0 and the current mask value. The current mask value utilized in step 326 may be the mask value that was set at step 306, 310, 316, 322, or 324. For example, if the current mask value has been set to 1.0 (e.g., at step 306 or step 322), then at step 326 the final mask value will be set to 1.0 since 1.0 is: (1) the minimum of 1.0 and the current mask value (1.0) and (2) the maximum of 0.0 and the current mask value (1.0). In embodiments, the final mask value may be set at step 326 according to different limitations.

In this way, the final mask value may be set by the process 300 to a value in a continuum between 0.0 and 1.0, which allows the gain of the non-linear processor 110 to also be set to a more precise value in a continuum between 0.0 and 1.0. In particular, the final mask value may be output from the non-linear processor 110 and be used as the gain of the non-linear processor 110. The final mask value may be multiplied at combining point 112 with the initial echo-cancelled signal 111 to suppress any residual echo that has not been fully eliminated at the summing point 105, and to generate the final echo-cancelled audio signal 113.

Figure 4:
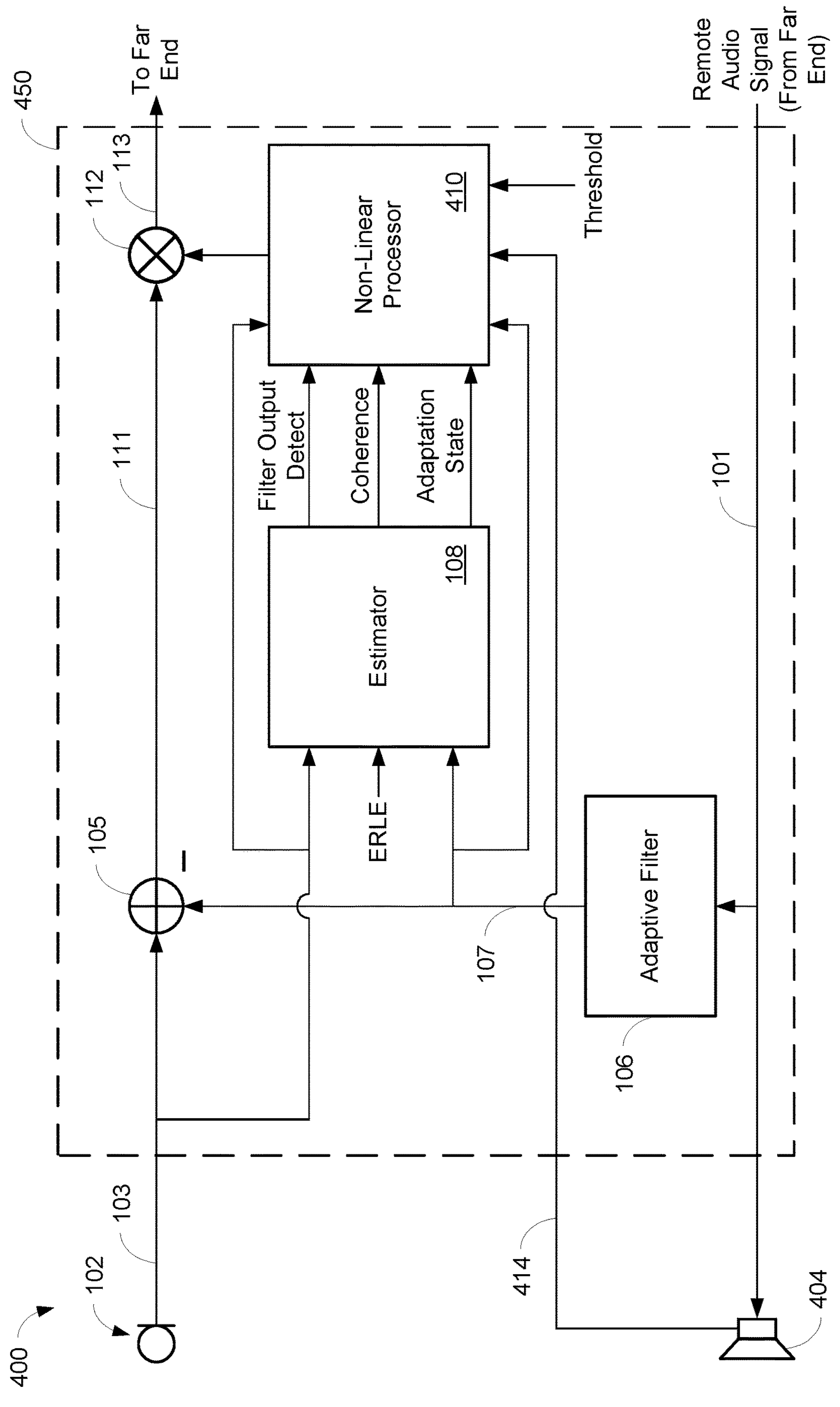
FIG. 4 is a schematic diagram of a communication system including an acoustic echo cancellation system that includes an estimator, a non-linear processor, and communication between a loudspeaker and the non-linear processor, in accordance with some embodiments.

FIG. 4 is a schematic diagram of a communication system 400 for capturing sound from audio sources in an environment using a microphone 102 and presenting audio from a remote location using a loudspeaker 404. The communication system 400 may include an acoustic echo cancellation system 450 that includes an adaptive filter 106, an estimator 108, and a non-linear processor 410. The communication system 400 may be similar to the communication system 100 of FIG. 1 as described above, except that there is communication between the loudspeaker 404 and the non-linear processor 410 (via a signal or message 414) to enable adjustment of the threshold of the non-linear processor 410 when the loudspeaker 404 is active. For simplicity, descriptions of the functions of the adaptive filter 106 and the estimator 108 will not be repeated here. It should be noted that while the communication system 400 shown in FIG. 4 has the ability to generate a mask value, as described previously, any suitable acoustic cancellation system having a non-linear processor may be able to use communication between the loudspeaker 404 and the non-linear processor 410 for adjustment of the threshold of the non-linear processor 410 when the loudspeaker 404 is active.

The threshold of the non-linear processor 410 may be adjusted when the loudspeaker 104 is active to help in suppressing far end single talk leakage. In particular, the threshold of the lowest frequency sub-band can be increased in the non-linear processor 410 when the loudspeaker 404 is active. For example, the lowest frequency sub-band may cover the range of 0-375 Hz, which can include the frequency range where most far end single talk leakage occurs. This adjustment of the threshold of the lowest frequency sub-band may be useful when the microphone 102 and the loudspeaker 404 are in close physical proximity, such as when the microphone 102 and the loudspeaker 404 are housed in the same device. In embodiments, the microphone 102 and the loudspeaker 404 may be in networked communication with one another.

The communication between the loudspeaker 404 and the non-linear processor 410 may include a signal or message 414 from the loudspeaker 404 to indicate that the loudspeaker 404 is active. In embodiments, a processor (not shown) in the communication system 400 may send the signal or message 414 to the non-linear processor 410 to indicate that the loudspeaker 404 is active.

Figure 5:
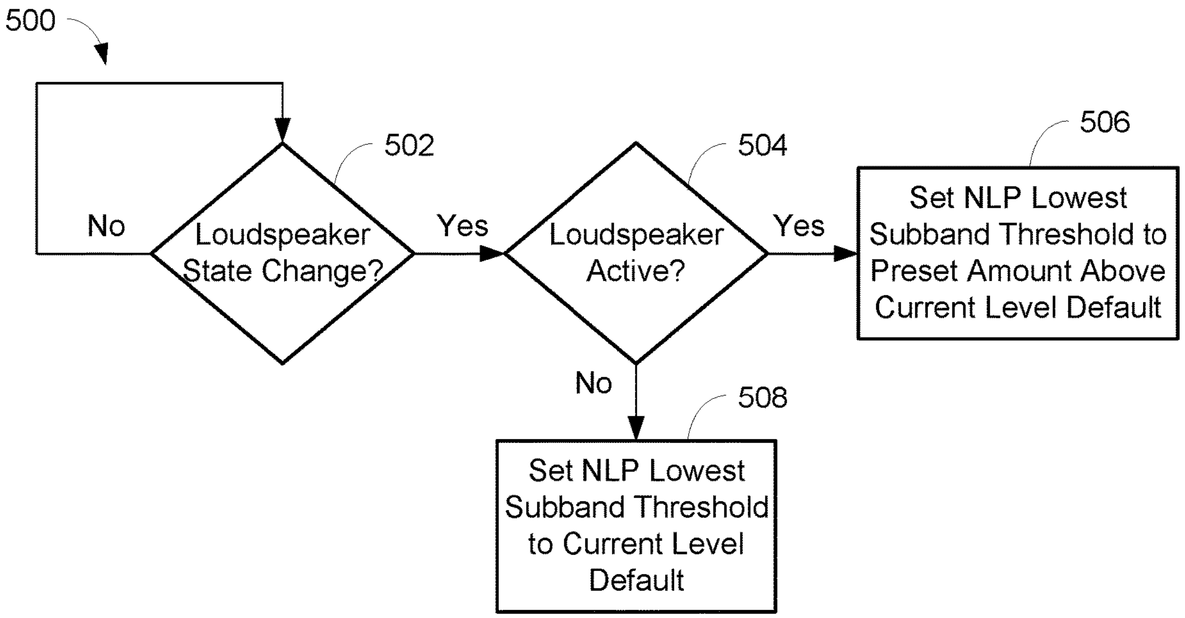
FIG. 5 is a flowchart illustrating operations for adjusting a threshold of the non-linear processor of FIG. 4 based on whether a state of the loudspeaker has changed and whether the loudspeaker is active, in accordance with some embodiments.
Figure 6:
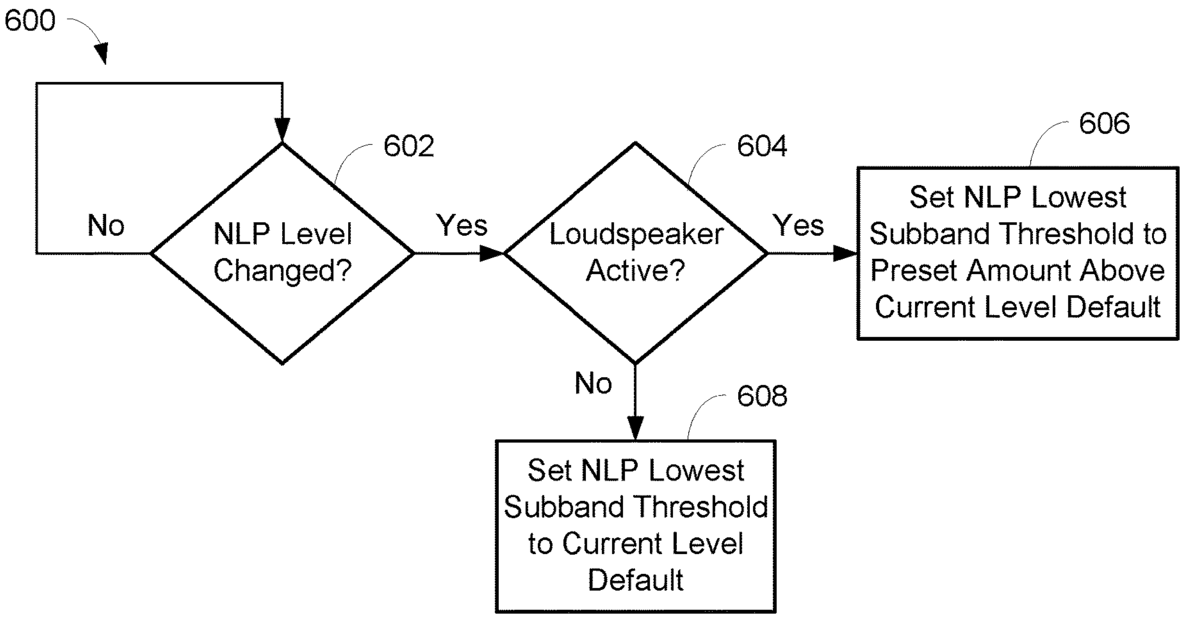
FIG. 6 is a flowchart illustrating operations for adjusting a threshold of the non-linear processor of FIG. 4 based on whether a level of the non-linear processor has changed and whether the loudspeaker is active, in accordance with some embodiments.

FIGS. 5-6 illustrate embodiments of methods for utilizing the communication system 400 and the acoustic echo cancellation system 450 where the threshold of the non-linear processor 410 can be adjusted. FIG. 5 illustrates a process 500 for adjusting a threshold of the non-linear processor 410 of FIG. 4 based on whether a state of the loudspeaker 404 has changed and whether the loudspeaker 404 is active. FIG. 6 illustrates a process 600 for adjusting a threshold of the non-linear processor 410 of FIG. 4 based on whether a level of the non-linear processor 410 has changed and whether the loudspeaker 404 is active. In embodiments, the process 500 and the process 600 can be executed independently and/or simultaneously.

The level of the non-linear processor 410 may determine the threshold of the non-linear processor 410. For example, the level of the non-linear processor 410 may be selected by a user to be low, medium, or high. For example, the threshold of the non-linear processor 410 when the level of the non-linear processor 410 is set to low may be lower than the threshold of the non-linear processor 410 when the level of the non-linear processor 410 is set to medium.

Referring to FIG. 5, the threshold of the non-linear processor 410 can be adjusted based on whether a state of the loudspeaker 104 has changed and whether the loudspeaker 404 is active. At step 502, it can be determined whether the loudspeaker 404 has changed its state. The loudspeaker 404 may be considered as changing its state if it becomes active (e.g., playing sound) or becomes inactive (e.g., stops playing sound). The non-linear processor 410 may detect that the loudspeaker 404 has changed its state via a message 414 sent from the loudspeaker 404. If it is determined that the loudspeaker 404 has not changed its state at step 502 ("NO" branch of step 502), then the process 500 may remain at step 502. However, if it is determined that the loudspeaker 404 has changed its state at step 502 ("YES" branch of step 502), then the process 500 may continue to step 504.

At step 504, it can be determined whether the loudspeaker 404 is active, for example, if loudspeaker 404 has been connected to play the far end remote audio signal 101. The non-linear processor 410 may detect that the loudspeaker 404 is active or inactive via a message 414 sent from the loudspeaker 404. If it is determined that the loudspeaker 404 is active at step 504 ("YES" branch of step 504), then at step 506, the threshold of the lowest frequency sub-band can be increased in the non-linear processor 110 by a predetermined amount (e.g., 5 dB) above the current level default. However, if it is determined that the loudspeaker 404 is inactive at step 504 ("NO" branch of step 504), then at step 508, the threshold of the lowest frequency sub-band can be set to the current level default. The current level default may be the threshold of the lowest frequency sub-band based on the current setting of the level of the non-linear processor 410.

Referring to FIG. 6, the threshold of the non-linear processor 410 of FIG. 4 can be adjusted based on whether a level of the non-linear processor 410 has changed and whether the loudspeaker 404 is active. At step 602, it can be determined whether a level of the non-linear processor 410 has changed. The level of the non-linear processor 410 may be changed, for example, by a user through a graphical user interface, command line interface, or other control interface. If it is determined that the level of the non-linear processor 410 has not changed at step 602 ("NO" branch of step 602), then the process 600 may remain at step 602. However, if it is determined that the level of the non-linear processor 410 has changed at step 602 ("YES" branch of step 602), then the process 600 may continue to step 604.

At step 604, it can be determined whether the loudspeaker 404 is active, such as if it has been connected to play the far end remote audio signal 101. The non-linear processor 410 may detect that the loudspeaker 404 is active or inactive via a message (e.g., message 414 of FIG. 4) transmitted from the loudspeaker 404. If it is determined that the loudspeaker 404 is active at step 604 ("YES" branch of step 604), then at step 606, the threshold of the lowest frequency sub-band can be increased in the non-linear processor 410 by a predetermined amount (e.g., 5 dB) above the current level default.

However, if it is determined that the loudspeaker 404 is inactive at step 604 ("NO" branch of step 604), then at step 608, the threshold of the lowest frequency sub-band can be set to the current level default.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

The description herein describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A device, comprising:

at least one processor configured to:

adjust a low band threshold of a non-linear processor based on whether a loudspeaker is active;

estimate, with an estimator, an adaptation state of an adaptive filter based on a microphone signal and a filtered remote audio signal; and generate, with the non-linear processor, a mask value usable as a gain of the non-linear processor, wherein the generation of the mask value is based on: the adaptation state of the adaptive filter, the microphone signal, and the filtered remote audio signal.

2. The device of claim 1, where the at least one processor is further configured to:

adaptively filter, with the adaptive filter, a remote audio signal to the filtered remote audio signal;

multiply the mask value with an initial echo-cancelled audio signal to generate a final echo-cancelled audio signal; and output the final echo-cancelled audio signal.

3. The device of claim 1, wherein the at least one processor is configured to estimate the adaptation state of the adaptive filter by:

generating, with a convergence integrator, a convergence variable indicating a convergence of the adaptive filter; and determining the adaptation state of the adaptive filter using the estimator based on a comparison of the convergence variable to a predetermined threshold.

4. The device of claim 3, wherein the at least one processor is configured to generate the convergence variable with the convergence integrator based on a comparison of a performance metric to one or more thresholds, and wherein the performance metric is derived from the microphone signal and the filtered remote audio signal.

5. The device of claim 1, wherein the at least one processor is configured to generate the mask value based on the adaptation state of the adaptive filter, a coherence of the microphone signal and the filtered remote audio signal, and a comparison of the microphone signal and the filtered remote audio signal with respect to a threshold of the non-linear processor.

6. The device of claim 5, wherein the coherence of the microphone signal and the filtered remote audio signal comprises a frequency domain correlation of the microphone signal and the filtered remote audio signal.

7. The device of claim 1, wherein the at least one processor is further configured to initialize the mask value with the estimator based on a coherence of the microphone signal and the filtered remote audio signal.

8. The device of claim 1, wherein the at least one processor is configured to generate the mask value with the non-linear processor by setting the mask value based on the adaptation state of the adaptive filter.

9. The device of claim 8, wherein the at least one processor is configured to generate the mask value with the non-linear processor by setting the mask value based on: the adaptation state of the adaptive filter, and a comparison of the microphone signal and the filtered remote audio signal with respect to a threshold of the non-linear processor.

10. The device of claim 1, wherein the at least one processor is configured to adjust the low band threshold of the non-linear processor when the loudspeaker is active such that far end single talk leakage is minimized.

11. The device of claim 1, wherein the at least one processor is configured to adjust the low band threshold of the non-linear processor further based on one or more of whether a state of the loudspeaker has changed or whether a level of the non-linear processor has been changed.

12. The device of claim 1, wherein the at least one processor is configured to adjust the low band threshold of the non-linear processor by:

increasing the low band threshold of the non-linear processor when the loudspeaker is active; and decreasing the low band threshold of the non-linear processor when the loudspeaker is not active.

13. A method, comprising:

adjusting a low band threshold of a non-linear processor based on whether a loudspeaker is active;

estimating an adaptation state of an adaptive filter based on a microphone signal and a filtered remote audio signal; and generating a mask value usable as a gain of the non-linear processor, wherein the generation of the mask value is based on: the adaptation state of the adaptive filter, the microphone signal, and the filtered remote audio signal.

14. The method of claim 13, further comprising:

adaptively filtering a remote audio signal to the filtered remote audio signal;

multiplying the mask value with an initial echo-cancelled audio signal to generate a final echo-cancelled audio signal; and outputting the final echo-cancelled audio signal.

15. The method of claim 13, wherein estimating the adaptation state of the adaptive filter comprises:

generating a convergence variable indicating a convergence of the adaptive filter; and determining the adaptation state of the adaptive filter based on a comparison of the convergence variable to a predetermined threshold.

16. The method of claim 13, wherein generating the mask value comprises generating the mask value based on the adaptation state of the adaptive filter, a coherence of the microphone signal and the filtered remote audio signal, and a comparison of the microphone signal and the filtered remote audio signal with respect to a threshold of the non-linear processor.

17. The method of claim 13, wherein adjusting the low band threshold of the non-linear processor is further based on one or more of whether a state of the loudspeaker has changed or whether a level of the non-linear processor has been changed.

18. The method of claim 13, wherein adjusting the low band threshold of the non-linear processor comprises:

increasing the low band threshold of the non-linear processor when the loudspeaker is active; and decreasing the low band threshold of the non-linear processor when the loudspeaker is not active.

* * * * *